US012746745B2

(12) United States Patent
Yasuda et al.

(10) Patent No.: US 12,746,745 B2
(45) Date of Patent: Sep. 29, 2026

(54) PRINTING APPARATUS, METHOD OF CONTROLLING PRINTING APPARATUS, AND STORAGE MEDIUM

(71) Applicant: CANON KABUSHIKI KAISHA, Tokyo (JP)

(72) Inventors: Midori Yasuda, Kanagawa (JP); Yusuke Kiyokawa, Tokyo (JP); Naoki Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/318,110

(22) Filed: May 16, 2023

(65) Prior Publication Data

US 2023/0391072 A1 Dec. 7, 2023

(30) Foreign Application Priority Data

Jun. 1, 2022 (JP) ................................ 2022-089483
Dec. 28, 2022 (JP) ................................ 2022-211858

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .. B41J 2/0451; B41J 2/16517; B41J 2/16508; B41J 2/16579; B41J 2/2142; B41J 2/04561; B41J 2/04586; B41J 2/125; B41J 2/1721; B41J 2/185; B41J 2/2135; B41J 2/2139; B41J 29/393; B41J 2029/3935
See application file for complete search history.

(56) References Cited

U.S. PATENT DOCUMENTS

| | | | | |
|---|---|---|---|---|
| 8,523,310 | B2 | 9/2013 | Uchida | |
| 8,636,334 | B2 | 1/2014 | Nishioka | |
| 8,651,622 | B2 | 2/2014 | Oikawa | |
| 8,919,912 | B2 | 12/2014 | Uchida | |
| 9,016,820 | B2 | 4/2015 | Uchida | |
| 9,028,032 | B2 | 5/2015 | Tamiya | |
| 9,227,442 | B2 | 1/2016 | Tamiya | |
| 9,676,182 | B2 | 6/2017 | Kiyokawa | |
| 2004/0095410 | A1 | 5/2004 | Miyashita | |
| 2012/0223991 | A1 | 9/2012 | Ono | |
| 2019/0143695 | A1* | 5/2019 | Cabello | B41J 2/185 347/32 |
| 2022/0016889 | A1 | 1/2022 | Kiyokawa | |
| 2022/0194076 | A1* | 6/2022 | Shindo | B41J 2/04581 |

* cited by examiner

*Primary Examiner* — Anh T Vo
(74) *Attorney, Agent, or Firm* — Venable LLP

(57) ABSTRACT

A printing apparatus includes: a printing head including a plurality of nozzles each configured to discharge a liquid droplet; a detection unit configured to detect the discharge of the liquid droplet by using a light beam emitted in a position facing the printing head; and a control unit configured to inspect whether discharge states of the nozzles are normal or abnormal based on a result of the detection by the detection unit. The control unit drives the nozzles on a per-nozzle group basis, each nozzle group including at least two or more nozzles and determines a discharge state on the per-nozzle group basis.

16 Claims, 14 Drawing Sheets

PRINTING APPARATUS, METHOD OF CONTROLLING PRINTING APPARATUS, AND STORAGE MEDIUM

BACKGROUND OF THE INVENTION

Field of the Invention

The present disclosure is related to a technique to detect a discharge state of an ink droplet discharged by a printing head.

Description of the Related Art

In ink jet type printing apparatuses, discharge states of ink droplets discharged from nozzles of a printing head is figured out on a nozzle-by-nozzle basis so as to maintain a constant quality of an image printed. Additionally, in terms of image formation, a discharge speed and a liquid droplet amount of the ink droplet to be discharged are set to favorable values for each ink color taking into consideration a printing head variation and a difference in the physical properties among ink colors. Moreover, there has been known that the discharge state of the discharged ink droplet is changed depending on the usage of the printing apparatus and an environmental effect. Specifically, it has been discovered that the physical properties of a discharged ink liquid droplet (a main droplet and a satellite droplet that is a micro liquid droplet generated from the split main droplet) such as a discharge speed (ejection speed), a size, an ejection interval, and a discharge direction are changed. Therefore, it is desirable to detect the discharge state of the discharged ink droplet and to determine whether the ink droplet is discharged normally before use of the printing apparatus.

As a technique to detect a discharge failure of a liquid droplet in an ink jet printing apparatus, there has been a technique to detect a discharge failure by using an optical detector including a pair of a light-emission element and a light-reception element (US2004/0095410, referred to as PTL 1 hereinafter). In PTL 1, an ink droplet is discharged from each nozzle such that the ink droplet will pass through a light beam emitted from the light-emission element to the light-reception element. If no decrease in a received light amount received by the light-reception element is detected, it is determined that there is a discharge failure of the liquid droplet.

US2012/0223991 (hereinafter, referred to as PTL 2) describes a technique to concurrently discharge liquid droplets from multiple nozzles in two adjacent nozzle rows and to detect a discharge failure in each nozzle by using the optical detector. PTL 2 describes a technique to detect a liquid droplet discharge state of each nozzle by emitting light such that a light axis from the optical detector will be off the center between the nozzle rows and concurrently discharging the liquid droplets from two nozzles in the adjacent nozzle rows.

However, in a case where the discharge state is detected on a nozzle-by-nozzle basis as described in PTL 1, an inspection requires longer time along with an increase in the number of nozzles to be inspected. In a case where the discharge states of the two nozzles in the adjacent nozzle rows are concurrently detected as described in PTL 2, it is required to use a detector with a light axis that covers the two nozzle rows, and the detector grows in size. In addition, it is required to use a circuit having accuracy enough to detect whether each liquid droplet is discharged, and this complicates the configuration and increases the cost.

SUMMARY OF THE INVENTION

An embodiment of the present invention is a printing apparatus, including: a printing head including a plurality of nozzles each configured to discharge a liquid droplet; a detection unit configured to detect the discharge of the liquid droplet by using a light beam emitted in a position facing the printing head; and a control unit configured to inspect whether discharge states of the nozzles are normal or abnormal based on a result of the detection by the detection unit, in which the control unit drives the nozzles on a per-nozzle group basis, each nozzle group including at least two or more nozzles and determines a discharge state on the per-nozzle group basis.

Further features of the present invention will become apparent from the following description of exemplary embodiments with reference to the attached drawings.

BRIEF DESCRIPTION OF THE DRAWINGS

FIG. 9 is a diagram showing the relationship of FIGS. 9A and 9B;

DESCRIPTION OF THE EMBODIMENTS

Figure 1:
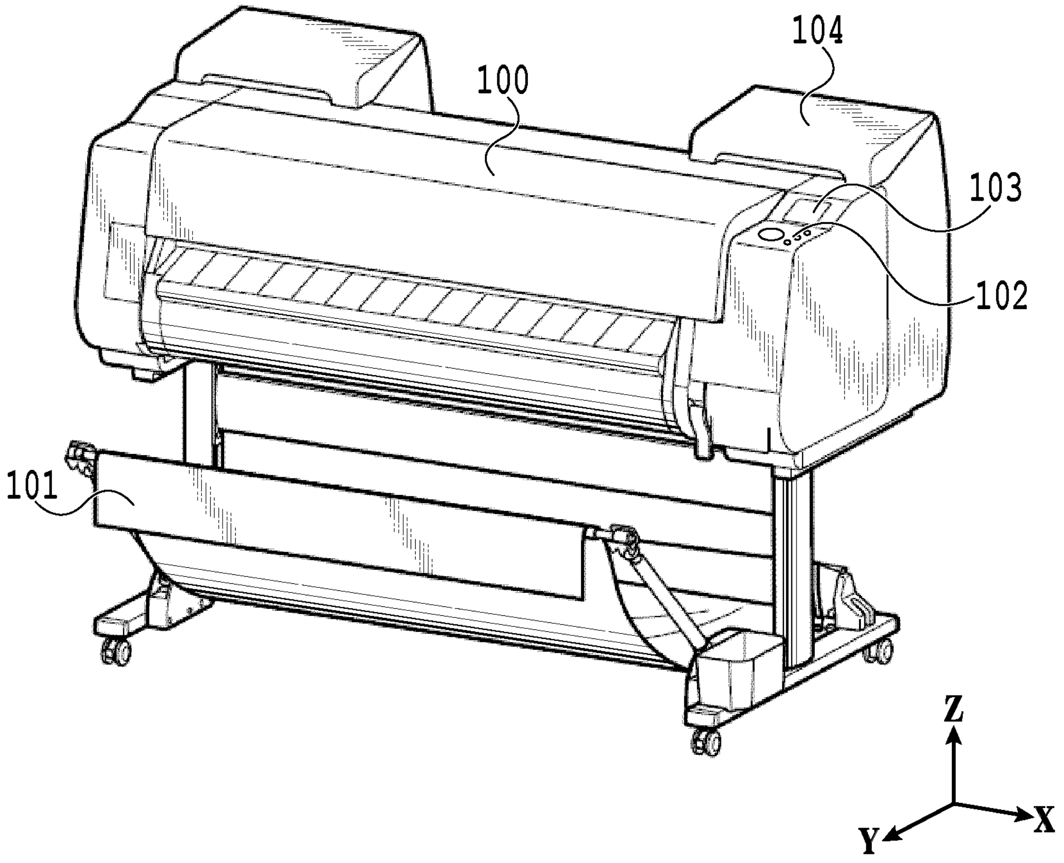
FIG. 1 is a diagram illustrating an exterior of a printing apparatus.

Preferable embodiments of the present disclosure are described below in detail with reference to the appended drawings. Note that, the following embodiments are not intended to limit the matters of the present disclosure, and not all the combinations of the characteristics described in the present embodiments are necessarily essential for the means for solving the problems of the present disclosure. Note that, the same constituents are denoted by the same reference numerals.

First Embodiment

<Overview of Printing Apparatus>

FIG. 1 is a diagram illustrating an exterior of an ink jet printing apparatus (hereinafter, a printing apparatus) 100 as an example of a liquid droplet discharge apparatus according to the present embodiment.

The printing apparatus 100 includes a sheet discharge guide 101 configured to stack outputted printing mediums, an operation button 102 configured to set a printing mode, printing paper, and the like, and a display panel 103 configured to display a variety of printing information, set results, and the like. Additionally, the printing apparatus 100 includes an ink tank unit 104 storing ink tanks reserving color inks of black, cyan, magenta, yellow, and the like and configured to supply the inks to a printing head 201 (see FIG. 2) as an example of a liquid droplet discharge head. Note that, the printing apparatus 100 illustrated in FIG. 1 is a printing apparatus capable of performing printing on printing mediums of multiple kinds of widths up to a printing medium in 60-inch size. It is possible to use roll paper or cut paper as the printing medium on which the printing apparatus 100 performs printing. Additionally, the printing medium is not limited to paper and may be cloth, vinyl, and the like, for example.

Figure 2:
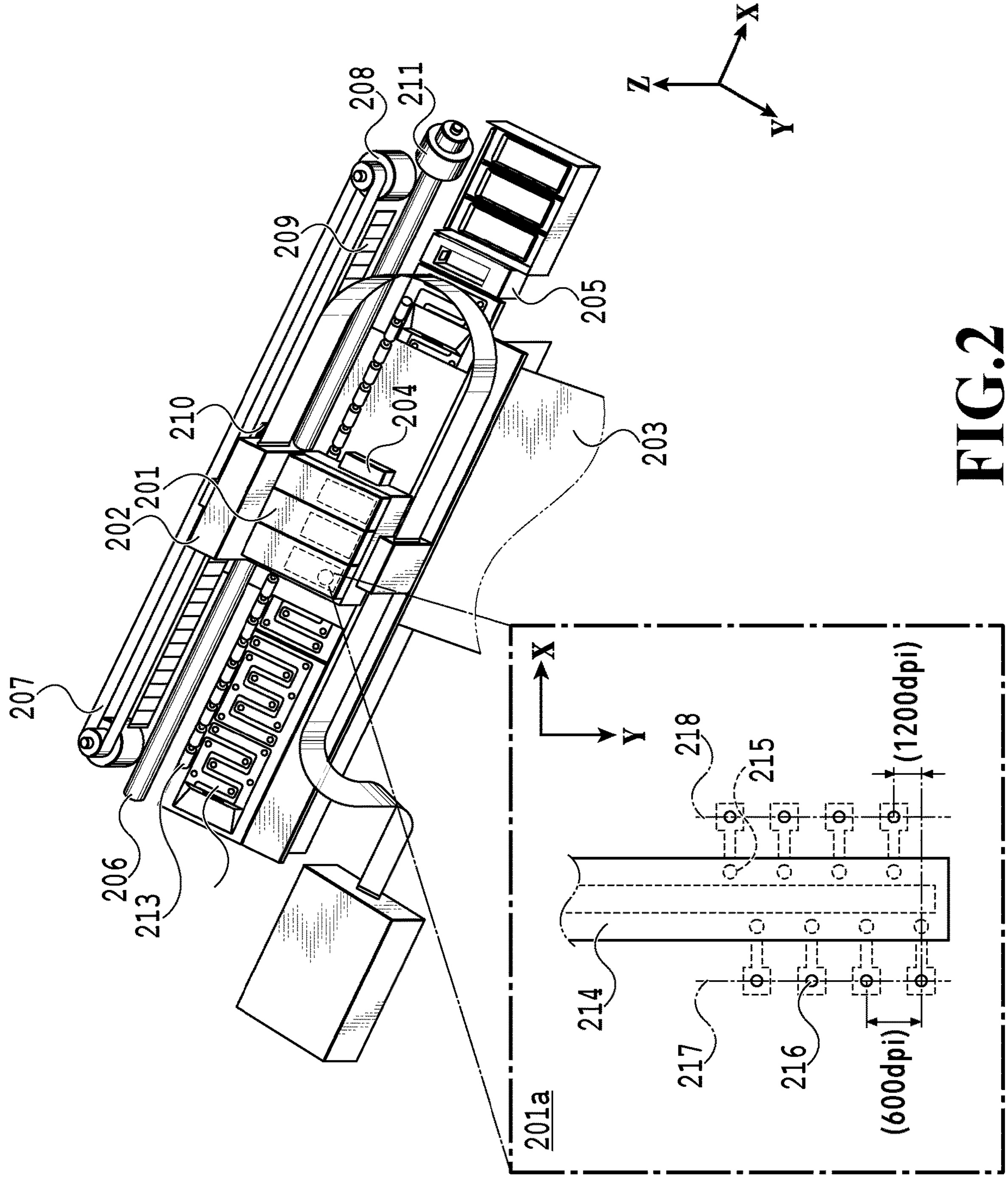
FIG. 2 is a perspective view illustrating an internal configuration of the printing apparatus.

FIG. 2 is a perspective view illustrating an internal configuration of the printing apparatus 100. A platen 212 is a member arranged in a position facing the printing head 201 and is configured to support a printing medium 203 conveyed to the position. The printing medium 203 is conveyed in a conveyance direction (Y direction) by a sheet conveyance roller 213 while being supported by the platen 212. The printing head 201 is mounted on a carriage 202.

Figure 4B:
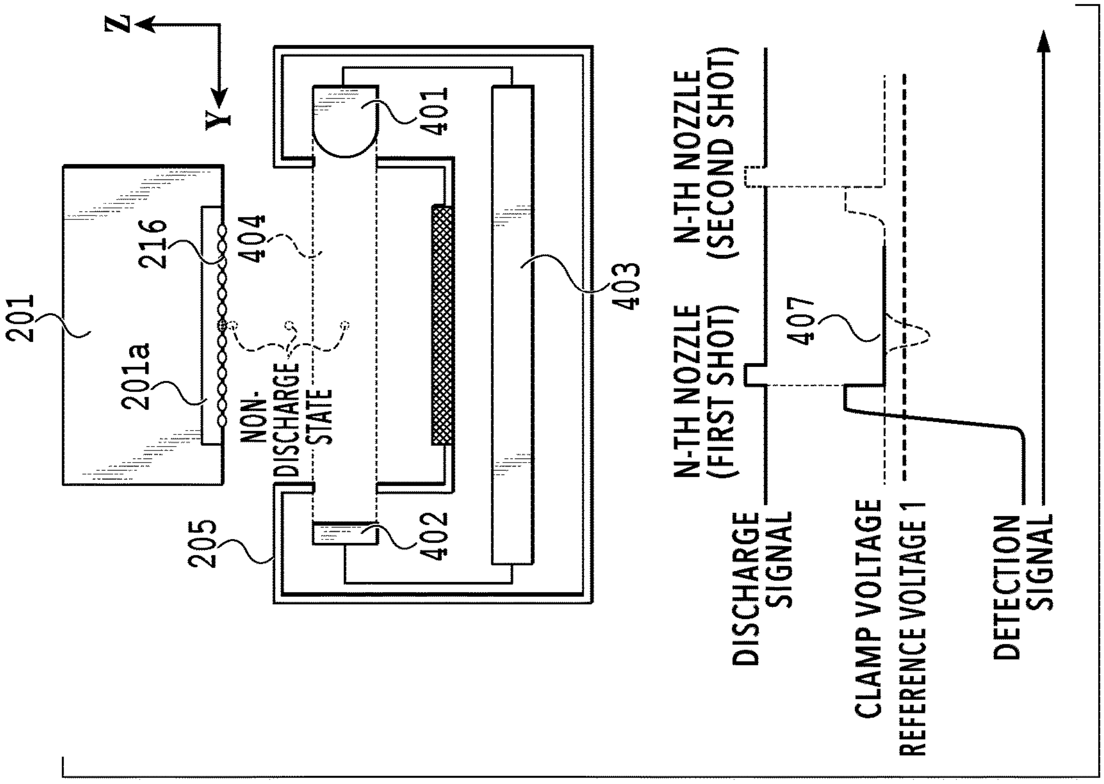
FIGS. 4A and 4B are diagrams describing a method of detecting a discharge state of an ink droplet.
Figure 4A:
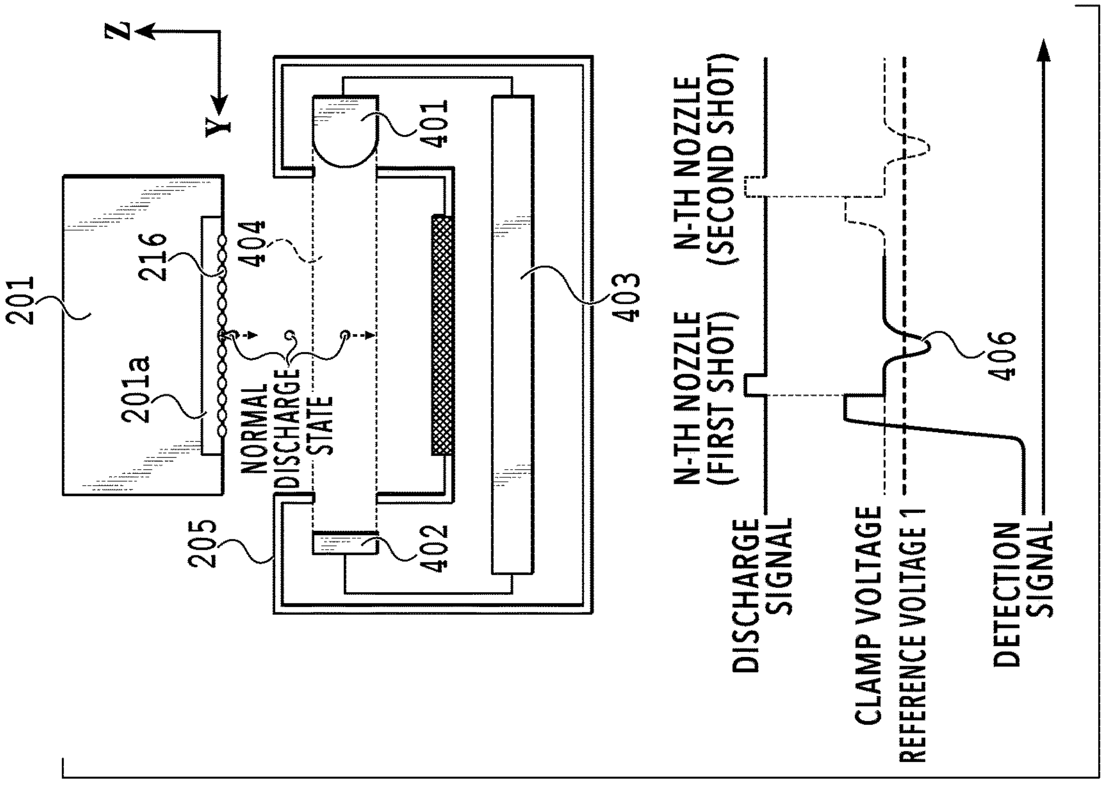

Additionally, the printing head 201 includes a distance detection sensor 204 configured to detect a distance between the printing medium 203 on the platen 212 and the printing head 201. The distance detection sensor 204 is an optical sensor that includes a light-emission element configured to emit light onto the printing medium 203 and a light-reception element configured to receive light reflected from the printing medium 203 to measure a distance based on a change in output from a received light amount received by the light-reception element. A liquid droplet detection sensor 205 is an optical sensor configured to detect a liquid droplet (here, an ink droplet) discharged from the printing head. As illustrated in FIGS. 4A and 4B described later, the liquid droplet detection sensor 205 includes a light-emission element 401, a light-reception element 402, and a control circuit board 403. Details of the liquid droplet detection sensor 205 are described later.

A main rail 206 is configured to support the carriage 202. The carriage 202 reciprocally scans in an X direction (a direction orthogonal to the conveyance direction of the printing medium) along the main rail 206. The carriage 202 scans with a carriage motor 208 being driven and a carriage conveyance belt 207 being moved. A linear scale 209 is arranged in a scan direction in which the carriage 202 scans. Positional information on the carriage 202 is obtained with an encoder sensor 210 mounted on the carriage 202 detecting the linear scale 209. The printing apparatus 100 includes a lift cam (not illustrated) configured to displace in stages a height of the main rail 206 supporting the carriage 202 and a lift motor 211 configured to drive the lift cam. With the lift cam being moved by driving the lift motor 211, it is possible to raise and lower the printing head 201 to make a distance between the printing head 201 and the printing medium 203 close and far.

The printing head 201 includes a discharge port surface (so-called a face surface) 201*a* in which a discharge port is formed. A heater configured to generate energy to discharge a liquid such as the ink and a member forming the discharge port are provided inside the discharge port surface 201*a*. A common liquid chamber 214 is provided for each ink color in the discharge port surface 201*a*. The ink is supplied to multiple arrayed discharge ports 216 through corresponding ink channels 215. Additionally, it is possible to discharge the ink from the discharge ports by a pressure generated along with driving of the heater, and thus it is possible to form an image. With the multiple discharge ports 216 being arrayed along the Y direction in the discharge port surface 201*a*, a discharge port row is formed for each ink color. A multiple number of such discharge port rows are arrayed in the X direction. In addition, the arrayed discharge port rows each include 2048 nozzles. Note that, in the present embodiment, the discharge port rows are not arranged as a simple single row but in a staggered nozzle arrangement. For this reason, if numbers are given to the discharge ports from one end of each nozzle row in order, there are two separated rows, which are a discharge port row 217 in which the order of the discharge ports has odd numbers and a discharge port row 218 in which the order of the discharge ports has even numbers. Here, the discharge port row having odd numbers is referred to as an "odd number nozzle row", and the discharge port row having even numbers is referred to as an "even number nozzle row". Accordingly, each of the odd number nozzle row and the even number nozzle row includes 1024 nozzles, and an interval between the two rows is about 0.6 mm. Additionally, a printing resolution of 1200 dpi (dot/inch) is achieved by a combination of two nozzle rows from the respective nozzle rows, which are the odd number nozzle row and the even number nozzle row, and an interval between the nozzles in each of the odd number nozzle row and the even number nozzle row is 600 dpi. Moreover, a liquid droplet amount of the ink droplet discharged from the discharge port surface 201*a* of the printing head 201 is mainly around 4 pl to 6 pl.

Figure 3:
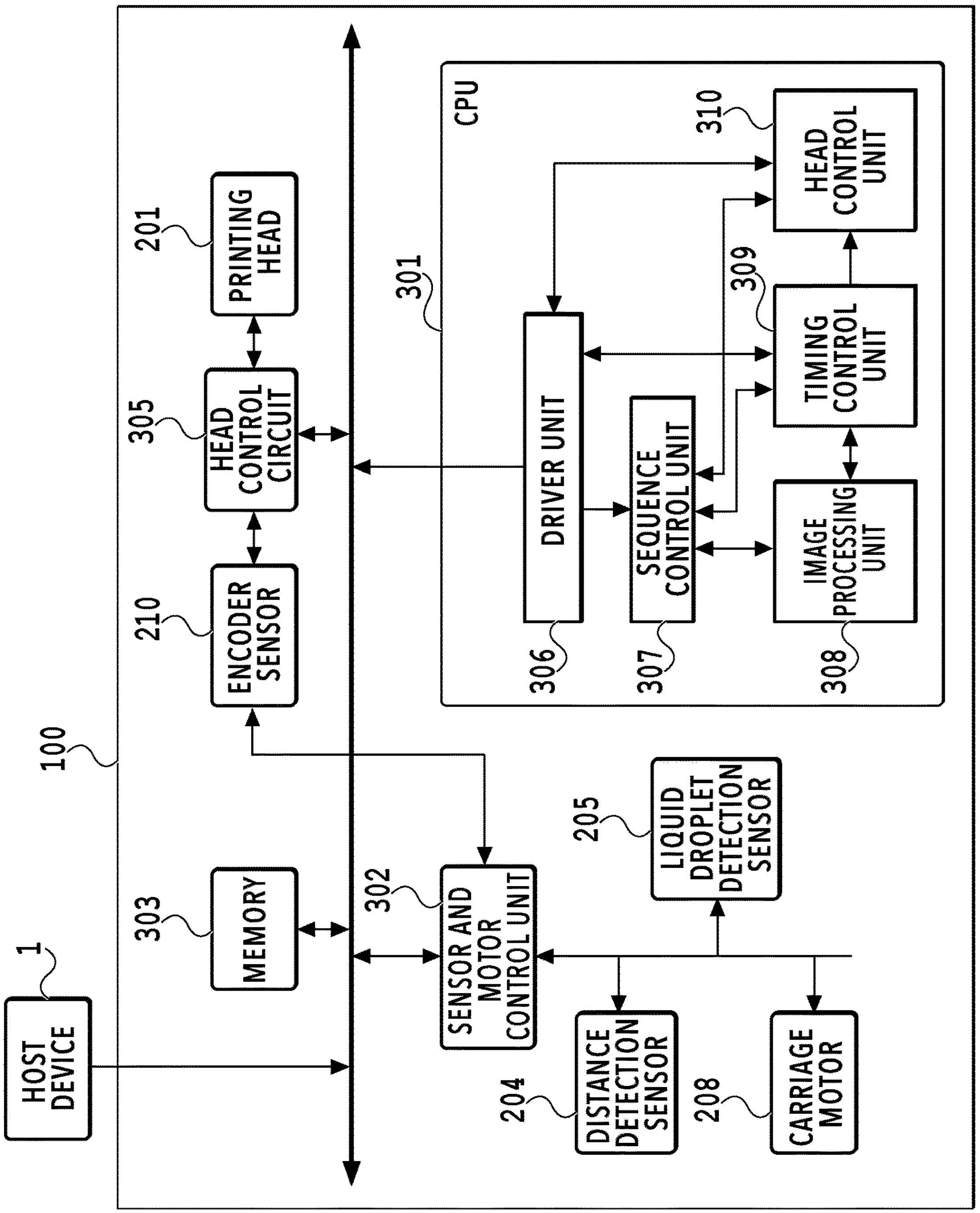
FIG. 3 is a block diagram illustrating a control configuration of the printing apparatus.

FIG. 3 is a block diagram illustrating a control configuration of the printing apparatus 100. The printing apparatus 100 includes a CPU 301 configured to control overall the apparatus, a sensor and motor control unit 302 configured to control each of the sensors and the motors, and a memory 303 configured to store various types of information such as a discharge state and a thickness of the printing medium. The CPU 301, the sensor and motor control unit 302, and the memory 303 are communicably connected to each other. The sensor and motor control unit 302 controls the distance detection sensor 204, the liquid droplet detection sensor 205, and the carriage motor 208 that allows the carriage 202 to scan. Additionally, the sensor and motor control unit 302 controls a head control circuit 305 based on the positional information detected by the encoder sensor 210 and discharges the ink from the printing head 201.

The CPU 301 converts image data transmitted from a host device 1 into a discharge signal, and the printing head 201 discharges the ink in accordance with the discharge signal; thus, printing on the printing medium 203 is performed. The CPU 301 includes a driver unit 306, a sequence control unit 307, an image processing unit 308, a timing control unit 309, and a head control unit 310. The sequence control unit 307 controls overall printing control and, specifically, activates and stops the image processing unit 308, the timing control unit 309, and the head control unit 310 that are functional blocks, performs conveyance control on the printing medium, and performs scan control on the carriage 202, for example. The functional blocks included in the CPU 301 are controlled with the sequence control unit 307 reading and executing various programs from the memory 303. The driver unit 306 functions as an I/O control unit configured to control input and output. For example, based on an instruction from the sequence control unit 307, the driver unit 306 generates a control signal to the sensor and motor control unit 302, the memory 303, the head control circuit 305, and the like and transmits an input signal from each block to the sequence control unit 307.

The image processing unit 308 performs image processing in which the image data inputted from the host device 1 is color-separated, and data obtained by the color separation is converted into printing data that can be printed by the printing head 201. The timing control unit 309 transfers the printing data generated by the conversion by the image processing unit 308 to the head control unit 310 in accordance with the position of the carriage 202. Additionally, the timing control unit 309 also controls a signal synchronized with the discharge from each nozzle for determining the discharge state of the ink droplet. The head control unit 310 functions as a generation unit configured to generate the discharge signal, converts the printing data inputted from the timing control unit 309 into the discharge signal, and outputs the discharge signal. Additionally, based on an instruction from the sequence control unit 307, the head control unit 310 performs temperature control on the printing head 201 by outputting a control signal to the extent that does not cause ink discharge. The head control circuit 305 functions as a generation unit configured to generate a driving pulse, generates the driving pulse in accordance with the discharge signal inputted from the head control unit 310, and applies the driving pulse to the printing head 201.

<Method of Detecting Discharge State of Ink Droplet>

FIGS. 4A and 4B are diagrams describing a method of detecting the discharge state of the ink droplet discharged from the printing head 201. An upper diagram of FIG. 4A and an upper diagram of FIG. 4B each illustrate a schematic view of the printing head 201 and the liquid droplet detection sensor 205 taken along a Y-Z cross-section of the printing apparatus 100. As illustrated in FIGS. 4A and 4B, for image formation, the discharge port (also referred to as a nozzle) 216 configured to discharge the ink droplet of each ink color is provided in the discharge port surface 201*a* of the printing head 201.

Additionally, a lower diagram of FIG. 4A and a lower diagram of FIG. 4B each illustrate a timing chart of the discharge signal for applying the driving pulse to the printing head 201 and a signal detected at the time of detecting the pass-through of the ink droplet discharged from the discharge port 216 by the liquid droplet detection sensor 205. As illustrated in FIGS. 4A and 4B, the printing head 201 includes the discharge port surface 201*a*. The liquid droplet detection sensor 205 includes the light-emission element 401, the light-reception element 402, the control circuit board 403, and the like. The light-emission element 401 emits a light beam 404, and the light-reception element 402 receives the light beam 404 emitted by the light-emission element 401. The control circuit board 403 detects a received light amount of the light received by the light-reception element 402. A current-voltage conversion circuit configured to convert a current flowing based on the light amount of the light received by the light-reception element 402 into a voltage signal and to output the voltage signal, and an amplifier circuit for a level of the detection signal of the ink droplet are provided on the control circuit board 403. In addition, output may be saturated and an S/N ratio may be decreased by fluctuation in the level of the detection signal of the discharge of the ink droplet due to a disturbance effect. In order to eliminate such an effect, a clamp circuit configured to maintain a level of the signal outputted from the amplifier circuit at a predetermined value (a clamp voltage) until immediately before the discharge is observed is provided. Such a circuit secures a level of the detection signal obtained by desirable discharge for detecting a slight change including the discharge of the ink droplet. In such a configuration, if the ink droplet passes through the light beam 404 in the liquid droplet detection sensor 205, the received light amount received by the light-reception element 402 is changed, and the level of the outputted detection signal is changed. The discharge state of the nozzle as an inspection target is determined based on a result from comparison between the level of the outputted detection signal and a predetermined reference voltage. Note that, the nozzle to be inspected herein is also referred to as a "target nozzle".

Additionally, the liquid droplet detection sensor 205 is provided such that the light axis of the light beam 404 is in the same position as a surface of the platen 212 on a side supporting the printing medium 203 in a Z direction. Moreover, a slit is provided near each of the light-emission element 401 and the light-reception element 402 so as to concentrate the incident light beam 404 and to improve the S/N ratio. An X direction position of the printing head 201 in which it is possible to discharge the ink droplet such that the ink droplet passes through the light beam 404 is referred to as a "detectable position". In detecting the ink droplet so as to detect the discharge state of the ink droplet, the sensor and motor control unit 302 controls the carriage motor 208 according to an instruction from the sequence control unit 307, and the printing head 201 is moved to the detectable position. A cross-section area of the light beam 404 in the present embodiment is around 2 mm×2 mm. A parallel light projection area of the ink droplet in a case where the ink droplet passes through the light beam 404 is around 2^-3 (mm^2). The discharge port row and the light beam 404 are arranged in a relationship to be parallel to each other, and a creepage distance in a height direction (the Z direction) thereof is 2 to 10 mm. In a case where the creepage distance between each discharge port and the light beam 404 is short, it is possible to detect the pass-through of the ink droplet with the light beam 404 in a close position with respect to an ejection distance of the discharged ink droplet, and thus it is possible to stably detect the discharge state. However, with the discharge port row and the light beam 404 being close to each other, a diffusion light component emitted from the light-emission element 401 is reflected by the discharge port surface 201*a* of the printing head 201, and a light amount component received by the light-reception element 402 is generated. As a result, there is a possibility that the light amount component is superimposed on the detection signal as a noise component during the detection of the discharge state, and good detection cannot be performed. To deal with this, the creepage distance between the light beam 404 in the liquid droplet detection sensor 205 and the discharge port row on the printing head 201 is set taking into consideration the correlative relationship. It is desirable to detect the discharge state under more favorable arrangement. Additionally, it is desirable to arrange the light beam 404 in the liquid droplet detection sensor 205 and the platen 212 supporting the printing medium 203 at a substantially similar height (the Z direction). This is for matching the conditions during the detection of the discharge state of the ink droplet by the liquid droplet detection sensor 205 with the discharge state of the ink droplet onto the printing medium 203 during image formation.

Next, a configuration to detect the discharge state and the discharge failure of the discharged ink droplet is described in detail. The lower diagram of FIG. 4A is a graph illustrating a detection result in a case where the discharge port 216 (here, an "N-th nozzle") as the target of the inspection to detect the discharge state of the printing head 201 by the liquid droplet detection sensor 205 can normally discharge with the configuration illustrated in the upper portion of FIG. 4A. Based on the discharge signal outputted by the head control unit 310 and the head control circuit 305, the ink droplet is discharged toward the liquid droplet detection sensor 205. The control signal synchronized with the discharge of the ink droplet operates the above-described clamp circuit to maintain the level of the signal to be outputted at the predetermined clamp voltage value immediately before observing the discharge of the ink droplet.

Thereafter, the discharge of the ink droplet is started, and the operation by the clamp circuit is canceled immediately before the ink droplet discharged toward the light beam 404 blocks the light. Additionally, whether the discharge state is normal is determined by using a change amount when the ink droplet blocks the light beam 404 and blocks the light. In details, based on a decrease in the light amount with respect to a determined reference voltage value that occurs when the discharged ink droplet passes through the light beam 404 in the liquid droplet detection sensor 205, the fall below the reference voltage value (reference numeral 406) is detected, and it is determined that the discharge state is normal. Here, it is determined that the ink droplet is discharged normally from the N-th nozzle to be inspected. Note that, FIG. 4A illustrates a result of multiple times of execution of the discharge (first shot and second shot) from the N-th nozzle to be inspected so as to obtain a result with higher reliability on the detection result of the discharge state by the liquid droplet detection sensor 205.

The lower diagram of FIG. 4B is a graph illustrating a detection result of a case where the N-th nozzle as the target of the inspection to detect the discharge state of the printing head 201 does not discharge normally, that is, a case where the N-th nozzle is in a non-discharge state, as illustrated in the upper diagram of FIG. 4B. As with FIG. 4A, based on the discharge signal outputted by the head control unit 310 and the head control circuit 305, the ink droplet is discharged toward the liquid droplet detection sensor 205. However, in the example in FIG. 4B, the ink droplet cannot be discharged correctly, and the ink droplet is not ejected to the light beam 404. As a result, the ink droplet cannot block the light beam 404, and the decrease in the light amount that occurs in a case where the discharge is performed correctly cannot be achieved (reference numeral 407). Therefore, the signal output does not fall below the reference voltage value, and the discharge state cannot be detected. Accordingly, the N-th nozzle to be inspected is determined to be in the non-discharge state (also referred to as an abnormal state) where the ink droplet is not normally discharged. Additionally, the nozzle determined as not discharging the ink droplet normally is also referred to as a non-discharge nozzle or an abnormal nozzle.

<Method of Detecting Discharge State Performed on Per-Nozzle Group Basis>

Figure 5B:
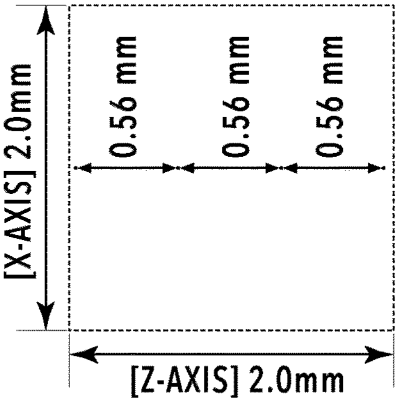
FIGS. 5A and 5B are diagrams describing a method of detecting the discharge state performed on a per-nozzle group basis.
Figure 5A:
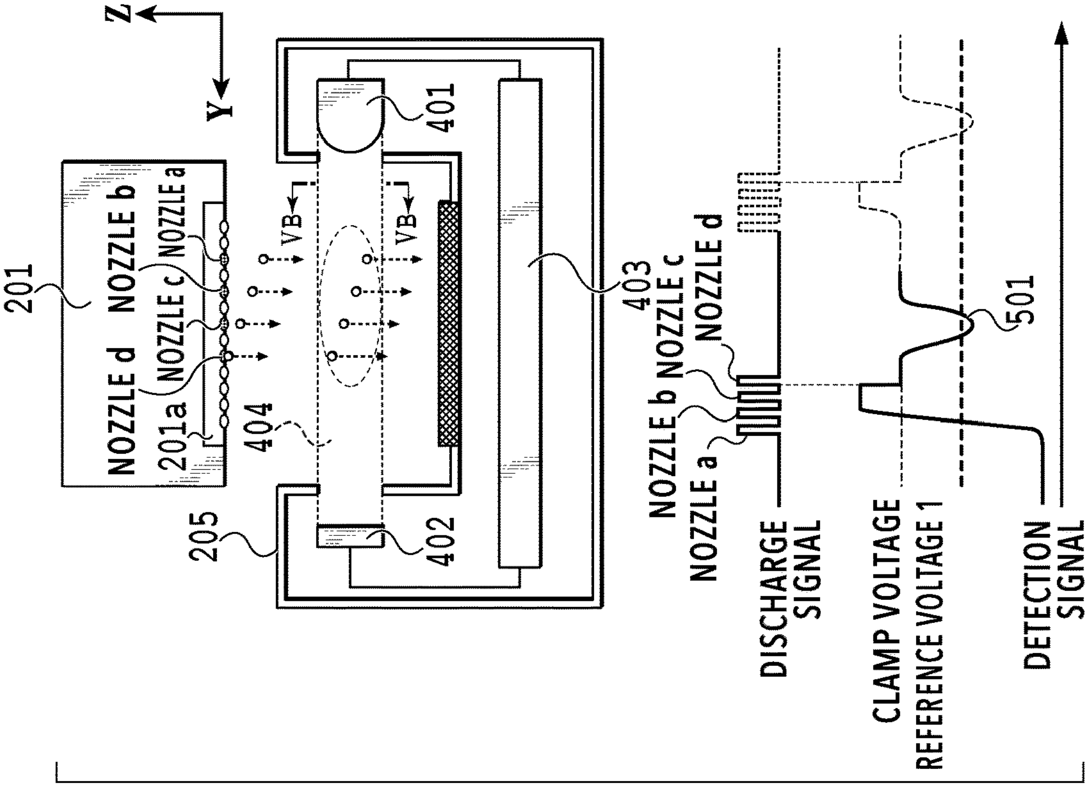

FIGS. 5A and 5B are diagrams describing a method of detecting the discharge state performed on a per-nozzle group basis in the present embodiment. A method of detecting the discharge state of the ink droplet discharged from the printing head 201 in the present embodiment is described with reference to FIGS. 5A and 5B. As with the example described with reference to FIGS. 4A and 4B, FIG. 5A illustrates a schematic view of the printing head 201 and the liquid droplet detection sensor 205 taken along the Y-Z cross-section of the printing apparatus 100. Additionally, FIG. 5A illustrates a timing chart of the discharge signal for applying the driving pulse to the printing head 201 and the detection signal detected at the time of detecting the pass-through of the ink droplet by the liquid droplet detection sensor 205. FIG. 5B is a diagram illustrating a cross-section of the light beam 404.

In the present embodiment, nozzles each nozzle group including multiple nozzles are used as nozzles to be inspected. That is, in the present embodiment, the nozzles included in the printing head 201 are divided into a certain number of groups. Then, the processing of detecting the discharge state is performed for each of the groups formed by the division. To be more specific, the nozzles belonging to the nozzle group to be inspected (hereinafter, also referred to as an "inspection nozzle group") are sequentially driven and discharge the ink droplets such that the ink droplets from the nozzles concurrently block the light beam 404. That is, as illustrated in FIG. 5B, the nozzles in the inspection nozzle group are sequentially driven such that the ink droplets discharged from the nozzles concurrently block the light beam 404 in the liquid droplet detection sensor 205. Driving the nozzles so as to concurrently block the light beam 404 means here to drive the nozzles so as to make a moment in which the multiple ink droplets discharged from the nozzles in the nozzle group concurrently block the light beam 404. In the present embodiment, control to sequentially drive the nozzles belonging to the inspection nozzle group is performed as described above. In this case, there occurs a predetermined time difference between discharge start timings of the ink droplets from the nozzles belonging to the group. Therefore, it is possible to generate a time difference between timings in which the discharged ink droplets reach and block the light beam 404 in the liquid droplet detection sensor 205, and the decreases in the light amount that occurs when the ink droplet passes through the light beam 404 are cumulatively added along with the time difference. As a result, it is possible to observe the discharge of the ink droplets based on a time difference between the control signal synchronized with the discharge and the blocking of the light. Note that, in a case where the ink droplets are discharged in the completely same timings with no time difference, an ink droplet from a nozzle close to the light-emission element may cover an ink droplet from a nozzle close to the light-reception element, and the detection cannot be properly performed in some cases. To deal with this, in the present embodiment, discharge control is performed such that the multiple ink droplets are ejected with predetermined time differences to concurrently block the light beam 404.

In FIGS. 5A and 5B, based on the discharge signal through the head control unit 310 in the CPU 301 and the head control circuit 305, the ink droplet is discharged from the printing head 201 toward the liquid droplet detection sensor 205. In the configuration illustrated in FIGS. 5A and 5B, the multiple nozzles belonging to the inspection nozzle group are nozzles in the same discharge port row. Additionally, the detection of the discharge state is performed on a group N to be inspected (here, the group N includes a nozzle a, a nozzle b, a nozzle c, and a nozzle d). FIGS. 5A and 5B are schematic views illustrating a detection result in a case where the group N discharges normally. Subsequent to the nozzle a belonging to the inspection nozzle group N, the discharge control on the nozzle b, the nozzle c, and the nozzle d is performed. As described above, the control signal synchronized with the discharge of the ink droplet maintains the level of the signal to be outputted at the predetermined clamp voltage value immediately before observing the discharge of the ink droplet. The discharge of the ink droplet is started, and the clamp operation is canceled immediately before the ink droplet discharged toward the light beam 404 blocks the light. As a result, a predetermined change in the detection signal occurs by the decrease in the light amount with respect to the reference voltage value determined based on the change amount when the ink droplet blocks the light beam 404, the decrease in the light amount occurring when the ink droplet discharged by the nozzle a starts passing through the light beam 404. In addition, the decrease in the light amount that occurs when the ink droplet discharged by the nozzle b at a predetermined time difference from the discharge by the nozzle a similarly passes through the light beam 404 is added and is also cumulatively added as a change amount in the detection signal. Moreover, the same applies to the ink droplets discharged from the nozzle c and the nozzle d, and the decrease in the light amount that occurs when the ink droplet passes through the light beam 404 is added and is also cumulatively added as a change amount in the detection signal. As a result, once the fall below the predetermined reference voltage value is detected, it is determined that the inspection nozzle group N is in a normal discharge state. As with the result illustrated in FIGS. 4A and 4B, in the example in FIGS. 5A and 5B, it is determined that the inspection nozzle group N to be inspected normally discharges. That is, it is determined that each nozzle belonging to the inspection nozzle group N normally discharges.

Note that, in the example illustrated in FIGS. 5A and 5B, an example where the nozzles belonging to the inspection nozzle group N include nozzles spaced apart by one nozzle in the same nozzle row is illustrated; however, it is not limited thereto. As long as the nozzles belong to the same nozzle row, it is possible to divide arbitrary nozzles into the nozzle groups. Any nozzles may be applicable as long as the nozzles can control the discharge timings such that the ink droplets pass through the light beam 404 at different discharge timings. Note that, in a case where a distance between the nozzles is extremely wide, effects on the light blocking by one dot may be varied; for this reason, it is preferable that multiple nozzles close to each other belong to the same inspection nozzle group N. Additionally, in the example in FIGS. 5A and 5B, an example where the number of the nozzles belonging to the nozzle group is four is described; however, as long as multiple nozzles are included, it is not limited to this number.

Figure 6:
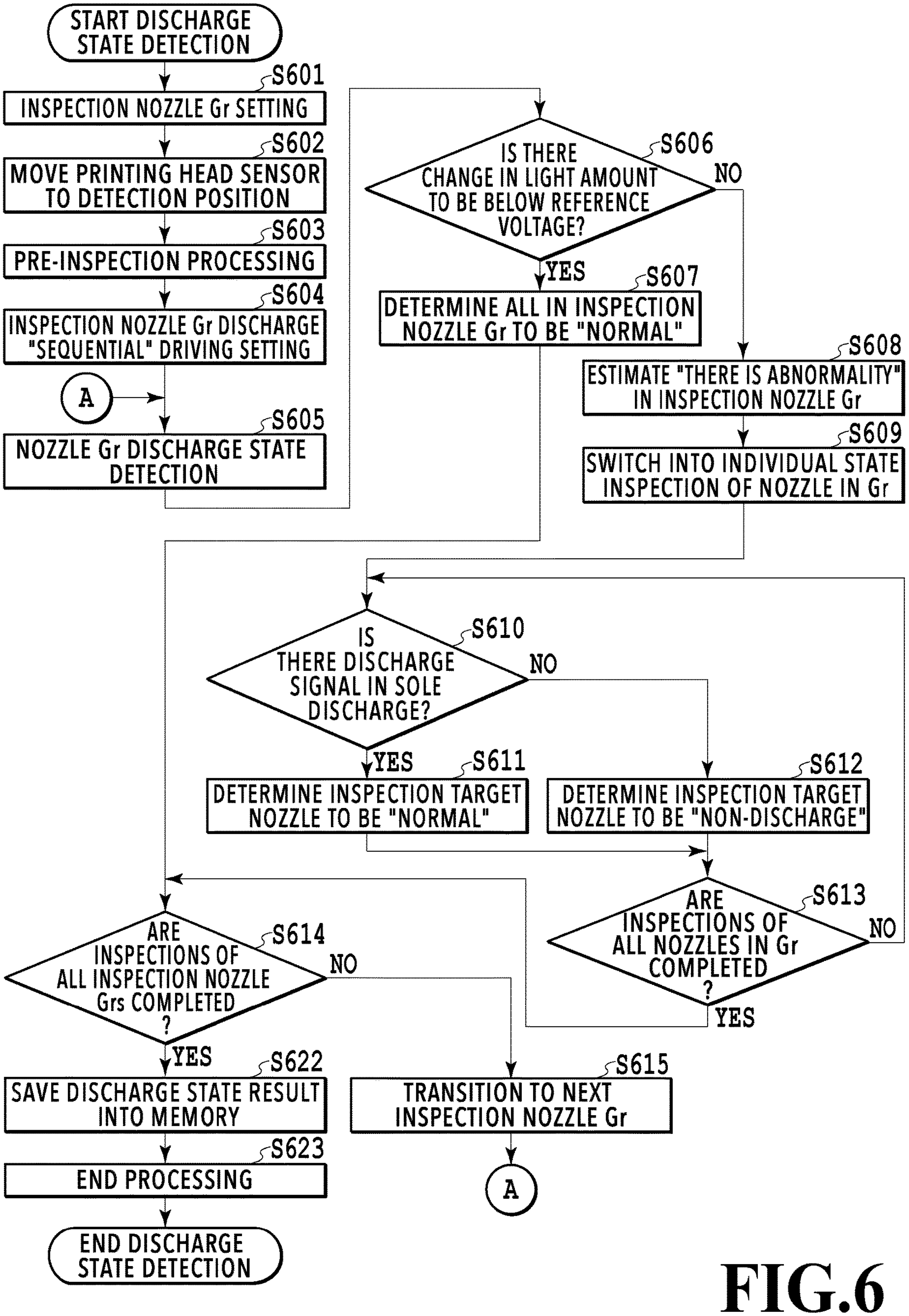
FIG. 6 is a diagram illustrating an example of a flowchart of control to detect the discharge state.

FIG. 6 is a diagram illustrating an example of a flowchart of the control to detect the discharge state in the present embodiment. FIG. 6 is an example of detecting the discharge state per nozzle group including multiple nozzles as illustrated in FIG. 5A. Note that, processing illustrated in FIG. 6 is processing performed by the sequence control unit 307 of the CPU 301 according to the program stored in the memory 303, for example. A sign "S" in description of each processing means that it is a step in the sequence diagram.

The detection control on the discharge state in FIG. 6 is processing performed at the time of operation of initial installation in which the user of the printing apparatus 100 operates the printing apparatus 100 first time, or immediately after replacing the printing head 201 and mounting a new one. The detection control may be performed on a regular basis as maintenance after the user uses the printing apparatus for a certain time. Additionally, the control in FIG. 6 may be executed as needed according to an instruction from the user.

First, in S601, the sequence control unit 307 sets the inspection nozzle group. Here, setting for allocating each nozzle to any one of the inspection nozzle groups is performed so as to inspect the discharge states of all the nozzles included in the printing head 201. That is, the multiple nozzles belong to one group, and which nozzle is allocated to each group is set.

Next, in S602, the sequence control unit 307 drives the carriage motor 208, performs the driving control on the printing head 201 and the carriage 202, and moves the printing head 201 to the detectable position of the liquid droplet detection sensor 205.

Next, in S603, the sequence control unit 307 executes preprocessing required to detect the discharge state. In details, the preprocessing may include presetting of optimal discharge control for detecting the discharge state, an auxiliary discharge operation for stable discharge of the ink droplet, a suction fan stop operation for stabilizing air flow control inside the printing apparatus, and the like.

Next, in S604, the sequence control unit 307 executes an operation to set discharge driving in discharging the ink droplet for the inspection from the printing head 201. In details, the discharge driving is set such that the discharge state of the ink droplet from the nozzle whose discharge state is to be inspected is stabilized, and the ink droplets discharged from the multiple nozzles concurrently pass through the light beam 404.

Next, in S605, the sequence control unit 307 executes the operation to discharge the ink droplet for the inspection from the printing head 201 such that the ink droplet passes through the light beam 404 emitted by the light-emission element 401 in the liquid droplet detection sensor 205. In details, the discharge of the ink droplet is started from each nozzle in the inspection nozzle group on the printing head 201. Then, the light-reception element 402 in the liquid droplet detection sensor 205 detects the detection signal indicating that the ink droplet passes through the light beam 404. In this process, the reference voltage for detecting the discharge state in accordance with the number of the nozzles used is also set based on the setting of the discharge driving of the multiple nozzles set in S604. The reference voltage and the detection signal are compared for determination, and thus the discharge state of the inspection nozzle group to be inspected is detected. That is, in this process, the detection of the discharge state is performed not on each nozzle, but on each inspection nozzle group.

Next, in S606, the sequence control unit 307 determines whether a waveform of a detection signal 501 falls below the predetermined reference voltage value. If the waveform of the detection signal 501 falls below the reference voltage, the processing proceeds to S607, and the sequence control unit 307 determines that all the nozzles in the inspection nozzle group discharge normally. On the other hand, if the waveform of the detection signal 501 does not fall below the reference voltage, the processing proceeds to S608, and the sequence control unit 307 determines that there is an abnormality in the nozzle in the inspection nozzle group. If the processing proceeds to S608, in S609, the processing is switched to a method of individually inspecting each of the nozzles in the inspection nozzle group as a current processing target. In details, as described with reference to FIGS. 4A and 4B, the processing of switching the set value of the reference voltage value into a value that allows for the detection of the discharge from each nozzle and causing the ink discharge by each nozzle is performed. In S609, each nozzle belonging to the inspection nozzle group is set as an inspection target nozzle.

Subsequent to S609, in S610, the sequence control unit 307 determines whether the detection signal from the sole discharge by the inspection target nozzle can be detected. That is, it is determined whether the waveform of the detection signal 501 falls below the reference voltage. If the waveform of the detection signal 501 falls below the reference voltage, the processing proceeds to S611, and the sequence control unit 307 determines the inspection target nozzle as a normal nozzle. On the other hand, if the waveform of the detection signal 501 does not fall below the reference voltage, the processing proceeds to S612, and the sequence control unit 307 determines the inspection target nozzle as a non-discharge nozzle and stores a nozzle number thereof into the memory 303. Subsequent to S611 or S612, in S613, the sequence control unit 307 determines whether the processing of all the nozzles in the inspection nozzle group ends, and if there is a nozzle not processed yet, the processing returns to S610 to repeat the processing. If the processing of all the nozzles in the inspection nozzle group ends, the processing proceeds to S614. Note that, the loop processing from S610 to S613 is processing in a case where it is determined that there is a non-discharge nozzle in the inspection nozzle group; however, it is also assumed that the discharge can be performed normally in discharging from each of the nozzles individually again. Thus, the processing in the loop processing from S610 to S613 all may proceed to S611, and all the target nozzles in the inspection nozzle group may be determined to be normal nozzles.

In S614, the sequence control unit 307 determines whether all the inspections of the inspection nozzle groups end. If the inspections of all the inspection nozzle groups do not end yet, the processing proceeds to S615, the inspection nozzle group as a next inspection target is set, and the processing proceeds to S605. If the inspections of all the inspection nozzle groups end, the processing proceeds to S616. In S616, the sequence control unit 307 saves results of the discharge states of all the nozzles included in the printing head 201 into the memory 303. That is, if the result of the discharge state of the inspection nozzle group is normal, it is a result that all the nozzles belonging to the inspection nozzle group are normal. On the other hand, if the discharge state of the inspection nozzle group is abnormal, an inspection result of each single nozzle belonging to the inspection nozzle group is saved into the memory 303. Information on the discharge state (also referred to as nozzle information) saved in this process is thereafter used for data processing and the driving control on the printing head 201 depending on required processing.

Next, the processing proceeds to S617, and the sequence control unit 307 performs end processing. In details, since the detection of the discharge state is completed, the printing head 201 is retracted to a predetermined position or transitions to a standby state for the next printing operation processing. In addition, based on the information on the obtained discharge state, the processing transitions to cleaning processing of the printing head 201 or the like, and the present processing ends.

Once the processing in FIG. 6 on a single discharge port row described above ends, the printing head 201 is moved to a position in which the ink droplet from the nozzle in the discharge port row to be inspected next enters the light beam 404, and the processing in FIG. 6 targeting the discharge port row to be inspected next is started. Note that, the end processing in S617 may be performed after the processing of all the discharge port rows ends.

Figure 7:
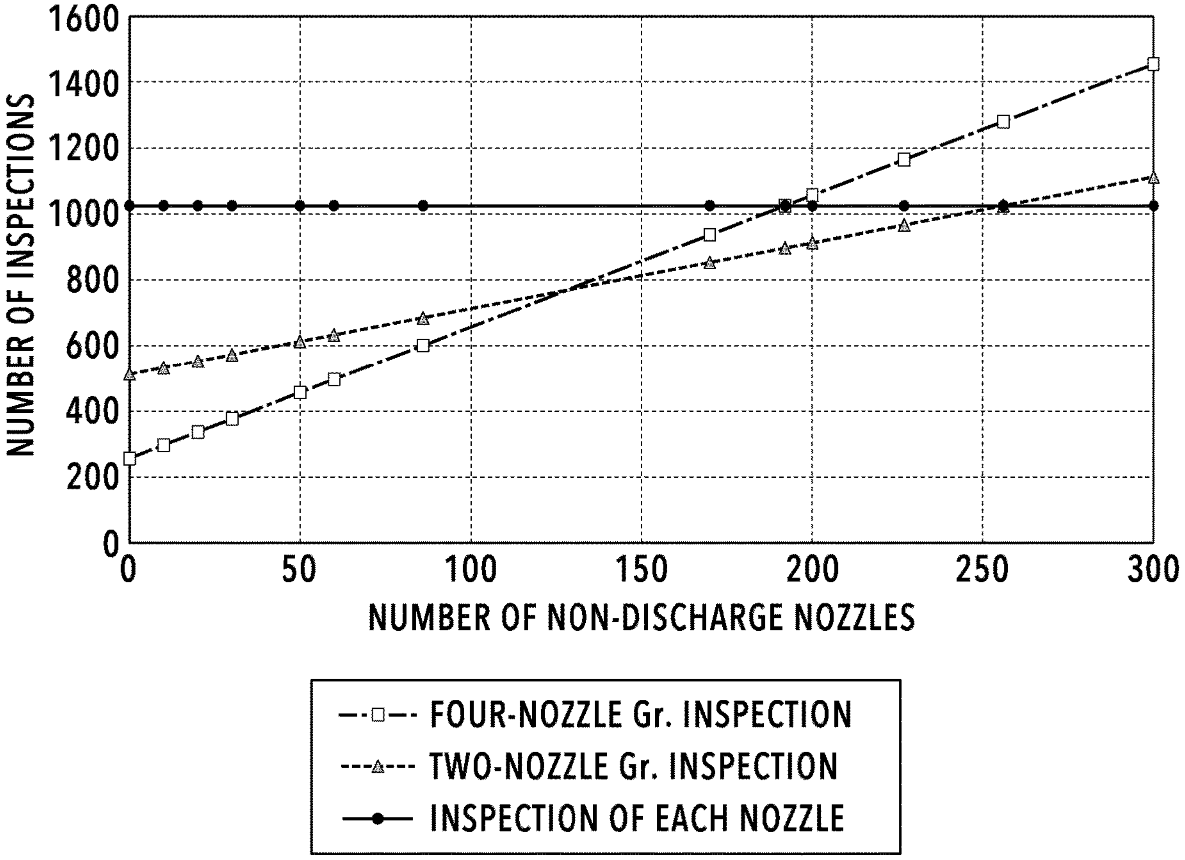
FIG. 7 is a graph in which the number of non-discharge nozzles is set to a horizontal axis while the number of inspections is set to a vertical axis.

FIG. 7 is a diagram describing an effect in the present embodiment. FIG. 7 is a graph in which the number of the non-discharge nozzles is set to the horizontal axis and the number of the inspections is set to the vertical axis. FIG. 7 is a diagram illustrating a comparison of the number of the inspections between a method of inspecting each nozzle and an example of the inspection on the per-group basis, the group including the multiple nozzles described in the present embodiment.

In a case of inspecting each nozzle, if one nozzle row includes 1024 nozzles, 1024 times of the inspections are necessary regardless of the number of the non-discharge nozzles. On the other hand, on a straight line of four-nozzle Gr. inspection in which the number of the nozzles belonging to the inspection nozzle group is four, the number of the inspections is 256 if the number of the non-discharge nozzles on an X-axis is 0 (origin) as illustrated in FIG. 7. That is, the number of the inspections is one-fourth of that of the inspection of each nozzle. However, as described above, if the number of the non-discharge nozzles is increased, the number of re-inspections on a per-nozzle basis is increased. As a result, the number of the inspections is reversed. Specifically, as illustrated in FIG. 7, if the number of the non-discharge nozzles is 192 or more, the number of the inspections is reversed between a case of inspecting each nozzle and the four-nozzle Gr. inspection.

In two-nozzle Gr. inspection in which each group includes two nozzles, if the number of the non-discharge nozzles is 0 (origin), the number of the inspections is 512, which is a half of that of the inspection of each nozzle. On the other hand, in the two nozzles Gr, until the number of the non-discharge nozzles reaches 256, the number of the inspections is less than that of the inspection of each nozzle as illustrated in FIG. 7. Thus, since the favorable number of the nozzles belonging to the inspection nozzle group can be changed depending on the number of the non-discharge nozzles, it is preferred to set the inspection nozzle group as needed depending on the assumed number of the non-discharge nozzles. As described above, in the present embodiment, an example where the number of the nozzles belonging to the inspection nozzle group is four is described; however, it is not limited thereto.

Note that, an example of the processing illustrated in FIG. 6 describes an example where the inspection is sequentially performed on each of the inspection nozzle groups, and if there is an abnormality, the processing on the per-group basis is suspended, and each of the individual nozzles belonging to the inspection nozzle group having an abnormality is inspected on the per-nozzle basis. In such processing, if the number of individual non-discharge nozzles is considerably greater than in the last inspection, a reverse phenomenon can occur in which the number of the inspections is greater than in a case of inspection on the per-nozzle basis as described with reference to FIG. 7. In a case where such a reverse phenomenon occurs, the processing on the per-group basis may be canceled in the middle of the processing in FIG. 6, and the processing may be switched into the inspection on the per-nozzle basis for the following inspection nozzle group not processed yet. In other words, in S614 in FIG. 6, it is possible to further determine whether the current number of the non-discharge nozzles is equal to or greater than a predetermined value. Then, if the number of the non-discharge nozzles is equal to or greater than the predetermined value, the processing may proceed to S609 instead of S605, and in the processing thereafter, the processing may be switched so as to perform the processing on the per-nozzle basis, not performing the processing on the per-group basis. Therefore, it is possible to suppress an enormous increase in the number of inspections.

On the other hand, the processing in the present embodiment is not limited to the processing order illustrated in FIG. 6. The processing of all the inspection nozzle groups may be performed regardless of whether the inspection nozzle group has an abnormality, and the individual nozzle in the inspection nozzle group having an abnormality may be inspected thereafter. The detection sensitivity may be different between the abnormality detection on the per-group basis and the abnormality detection on the per-nozzle basis. The sensitivity is adjusted in this case, and it is also possible to reduce the number of times of such sensitivity adjustment by executing the processing on the per-group basis all together.

As described above, according to the present embodiment, it is possible to detect the discharge state of the nozzle in a short time without complicating the configuration. That is, in the present embodiment, in a case of detecting the discharge state of the ink droplet discharged from the printing head 201, multiple nozzles are set as one group, and the discharge from the multiple nozzles is detected by the liquid droplet detection sensor 205. Then, whether all the nozzles belonging to the group can discharge is determined on the per-group basis. For the group determined to have a discharge abnormality, the discharge state is detected for each individual nozzle. Thus, it is possible to reduce the time for inspecting the discharge state. According to the present embodiment, it is possible to suppress an increase in the inspection time even in a case where the number of the nozzles of the printing head is increased.

Second Embodiment

In the first embodiment, an example where all the nozzles to be inspected are allocated to the inspection nozzle groups is described. However, in a case where the discharge state of the same printing head 201 is inspected as a second time or later, the nozzle information on the nozzle having a discharge abnormality in the last time is stored in the memory 303. The present embodiment is different from the first embodiment in that the number of the nozzles to be allocated to the inspection nozzle group is determined based on the nozzle information. The basic configuration is similar to the example described in the first embodiment.

Figure 8:
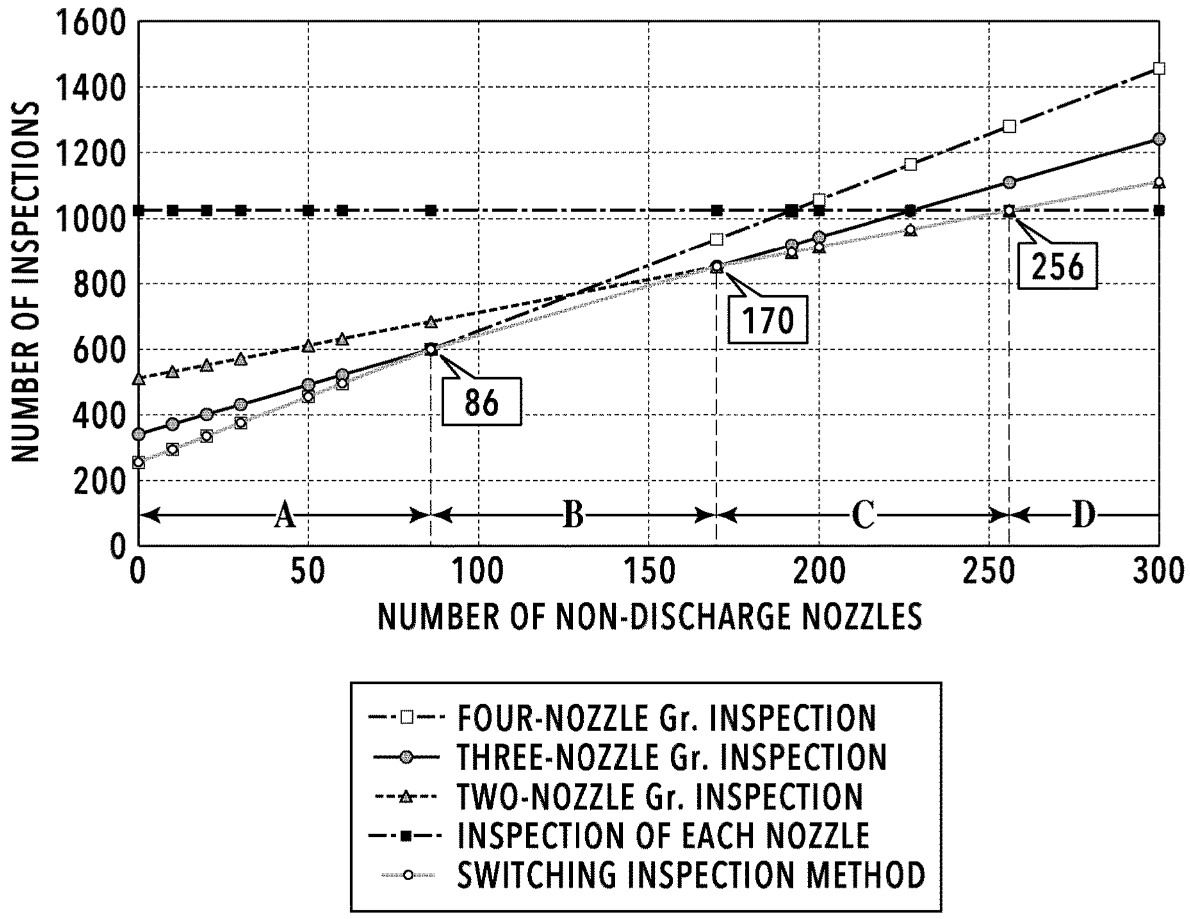
FIG. 8 is a graph in which the number of the non-discharge nozzles is set to a horizontal axis while the number of the inspections is set to a vertical axis.

FIG. 8 is a diagram illustrating a comparison in the number of the inspections for switching the number of nozzles to be allocated to the group in the present embodiment. As described with reference to FIG. 7, in a case where each nozzle is inspected, if one nozzle row includes 1024 nozzles, 1024 times of the inspections are necessary regardless of the number of the non-discharge nozzles. On the other hand, on a straight line of the four-nozzle Gr. inspection in which the number of the nozzles belonging to the inspection nozzle group is four, the number of the inspections is 256 times and is one-fourth of that of the inspection of each nozzle if the number of the non-discharge nozzles on the X-axis is 0 (origin). However, if the number of the non-discharge nozzles is increased, the number of re-inspections is increased.

To deal with this, in the present embodiment, it is possible to suppress the number of the inspections by executing the inspection by the four-nozzle Gr. inspection until the number of the non-discharge nozzles reaches 85 (an A section). In a case of a B section including 86 or more non-discharge nozzles, the number of the inspections is reversed between three-nozzle Gr. inspection and the four-nozzle Gr. inspection. That is, in the B section, it is possible to reduce the number of the inspections more by performing the three-nozzle Gr. inspection than by performing the four-nozzle Gr. inspection. Additionally, in a C section in a case where the number of the non-discharge nozzles is great and exceeds 170, it is possible to reduce the number of the inspections by selecting the two-nozzle Gr. inspection instead of the three-nozzle Gr. inspection. In the two-nozzle Gr. inspection, it is possible to reduce the number of the inspections more than the inspection of each nozzle until the number of the non-discharge nozzles reaches 256 (see the C section). If the number of the non-discharge nozzles is 256 or more, it is possible to reduce the number of the inspections more by selecting the inspection of each nozzle (see a D section).

Taking into consideration the above-described relationship, in the present embodiment, the number of the nozzles to be allocated to the inspection nozzle group is determined. That is, the number of the non-discharge nozzles in the last inspection is read from the nozzle information stored in the memory 303. Then, the number of the multiple nozzles allocated to the inspection nozzle group is determined depending on the number of the non-discharge nozzles in the last inspection. Therefore, it is possible to reduce the overall number of inspections. In details, in S601 in the flowchart in FIG. 6, the sequence control unit 307 reads the number of the non-discharge nozzles in the last inspection from the memory 303 and determines the number of the nozzles in the inspection nozzle group. Then, the nozzles may be allocated to the group according to the determined number of the nozzles. Note that, here, an example where the number of the nozzles to be allocated to the inspection nozzle group is determined depending on the number of the non-discharge nozzles in the last inspection is described; however, the determination may depend on not only the information in the last inspection but also the number of the non-discharge nozzles detected by all the previous inspections. That is, the number of the nozzles to be allocated to the inspection nozzle group may be determined in accordance with the number of the non-discharge nozzles (the number of the abnormal nozzles) obtained as a result of the previous inspections.

As described above, in the present embodiment, the number of the nozzles to be allocated to the inspection nozzle group is determined based on the number of the non-discharge nozzles in the last inspection. Therefore, it is possible to reduce the overall number of the inspections, and as a result, it is possible to reduce the inspection time.

Third Embodiment

In the first embodiment, an example where all the nozzles to be inspected are allocated to the inspection nozzle group is described. However, a nozzle that once has a discharge abnormality may never return to the normal discharge. To deal with this, in the present embodiment, with reference to the nozzle information in the memory 303, a nozzle (non-discharge nozzle) having the information that is stored in the memory 303 to indicate the discharge abnormality is not allocated to the group and inspected individually. Note that, the non-discharge nozzle having the information that is stored in the memory 303 to indicate the discharge abnormality is described as a nozzle that has a discharge abnormality in the last inspection; however, a nozzle that has a discharge abnormality in any one of previous inspections may be the non-discharge nozzle. That is, in the present embodiment, the nozzle to be allocated to the inspection nozzle group is determined out of nozzles excluding the non-discharge nozzle that has a discharge abnormality in a previous inspection.

Figure 9A:
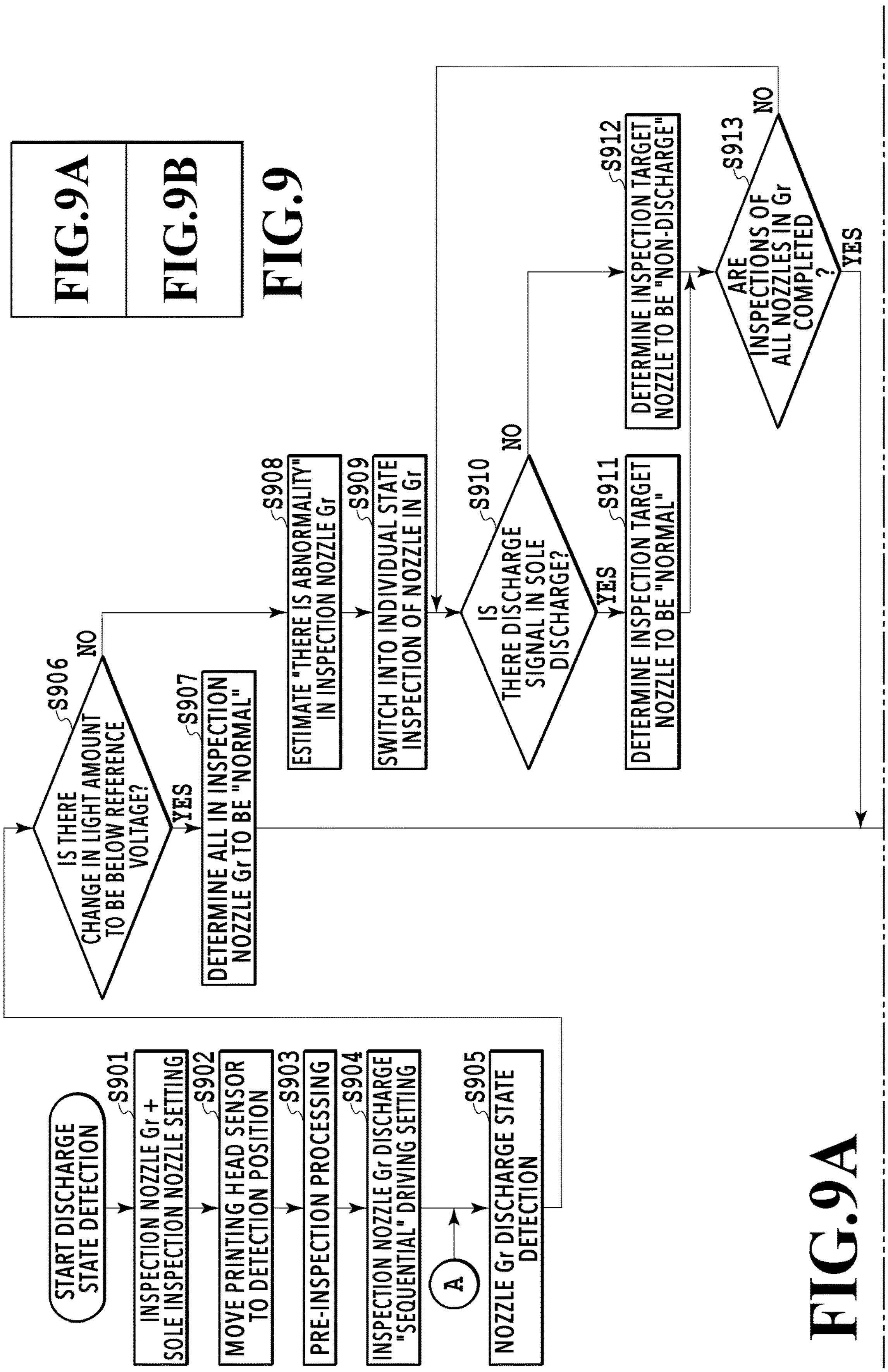
FIGS. 9A and 9B are totally a diagram illustrating an example of a flowchart of control to detect the discharge state.
Figure 9B:
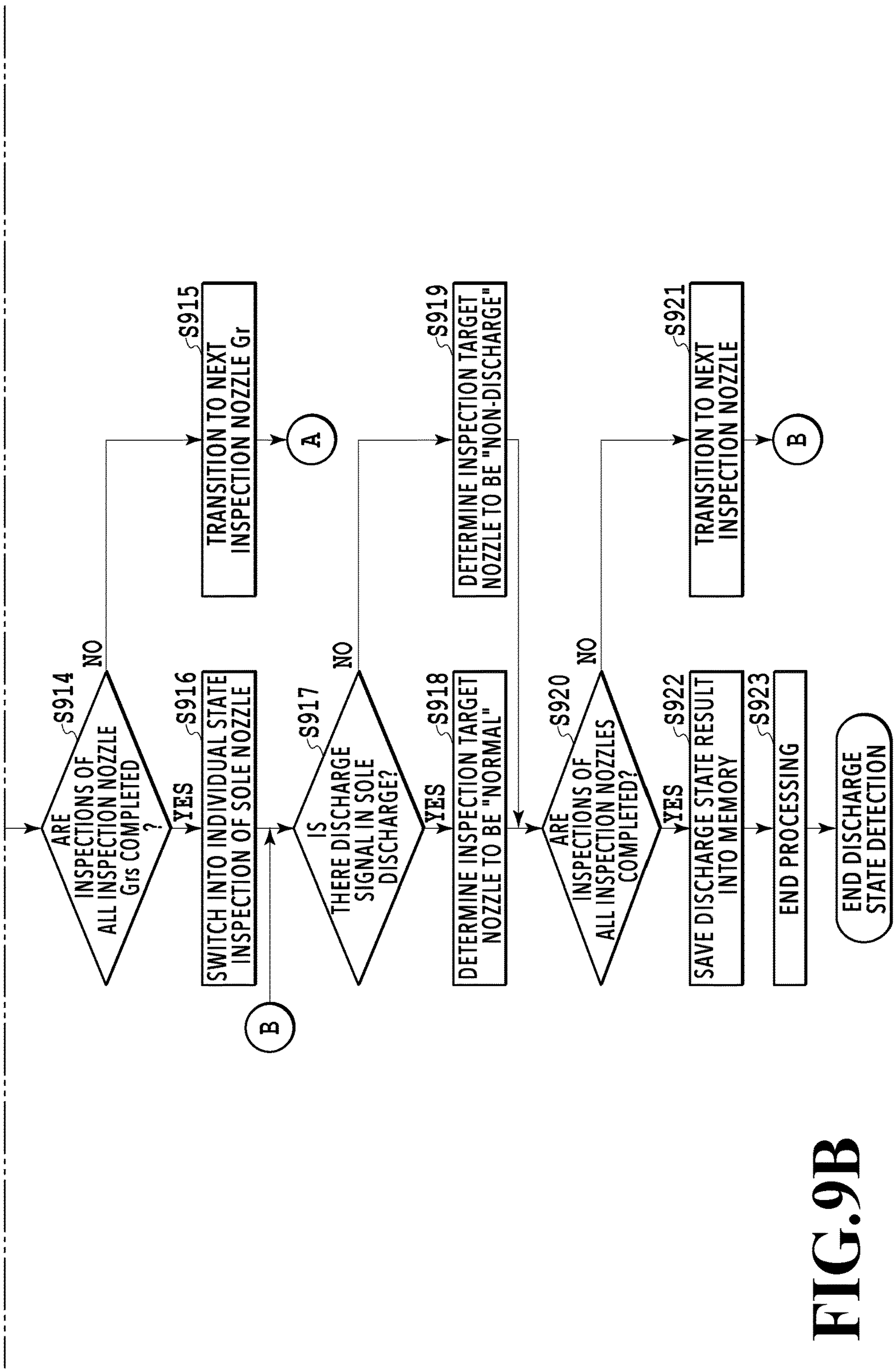

FIGS. 9A and 9B are totally a diagram illustrating an example of a flowchart of control to detect the discharge state in the present embodiment. Processing in FIGS. 9A and 9B partially includes the processing described in FIG. 6. In S901, the sequence control unit 307 sets the inspection nozzle group and the inspection nozzle to be inspected solely. Each nozzle belongs to either of the inspection nozzle group and the sole inspection nozzle so as to inspect the discharge states of all the nozzles included in the printing head 201. The sequence control unit 307 sets the inspection nozzle group such that one group includes multiple nozzles (here, four nozzles) out of a group of nozzles excluding the previous non-discharge nozzle with reference to the nozzle information stored in the memory 303. The number of the nozzles in one group is set to the same number between the groups so that an equal reference voltage can be set. Therefore, in a case where a nozzle remains ungrouped as a result of grouping excluding the non-discharge nozzle, a group of four nozzles is created by adding a close nozzle. Additionally, the sequence control unit 307 sets the non-discharge nozzle excluded from the inspection nozzle group as a sole inspection nozzle. The following processing from S902 to S915 is similar to each processing described from S602 to S615 described in the first embodiment; for this reason, description herein is omitted. Thus, the processing on the per-inspection nozzle group basis is completed.

In S914, if the inspections of all the inspection nozzle groups are completed, the processing proceeds to S916.

In S916, the sequence control unit 307 switches the processing to processing of detecting the sole inspection nozzle. Specifically, the sequence control unit 307 switches a set value of the reference voltage value into a value that allows for the detection of the discharge of each nozzle. Next, in S917, the sequence control unit 307 determines whether the waveform of the detection signal 501 falls below the reference voltage by discharging the ink droplet from each nozzle. If the waveform of the detection signal 501 falls below the reference voltage, the processing proceeds to S918, and it is determined that the detection target nozzle is normal. On the other hand, if the waveform of the detection signal 501 does not fall below the reference voltage, the processing proceeds to S919, and it is determined that the detection target nozzle is a non-discharge nozzle. Subsequent to S918 and S919, the processing proceeds to S920, and the sequence control unit 307 determines whether all the inspections of the sole nozzles are completed. If not all the inspections of the sole nozzles are completed, the processing proceeds to S921, and the processing transitions to the sole nozzle inspection of the next inspection target nozzle. If all the inspections of the sole nozzles are completed, the processing proceeds to S922, and the sequence control unit 307 saves results of the discharge states of all the nozzles included in the printing head 201 into the memory 303. The information on the discharge states saved in this process is thereafter used for data processing and the driving control on the printing head 201 depending on required processing.

Next, the processing proceeds to S923, and end processing is performed. In details, since the detection of the discharge state is completed, the printing head 201 is retracted to a predetermined position or transitions to a standby state for the next printing operation processing. In addition, based on the information on the obtained discharge state, the processing transitions to cleaning processing of the printing head 201 or the like, and thereafter the present processing ends.

Figure 10:
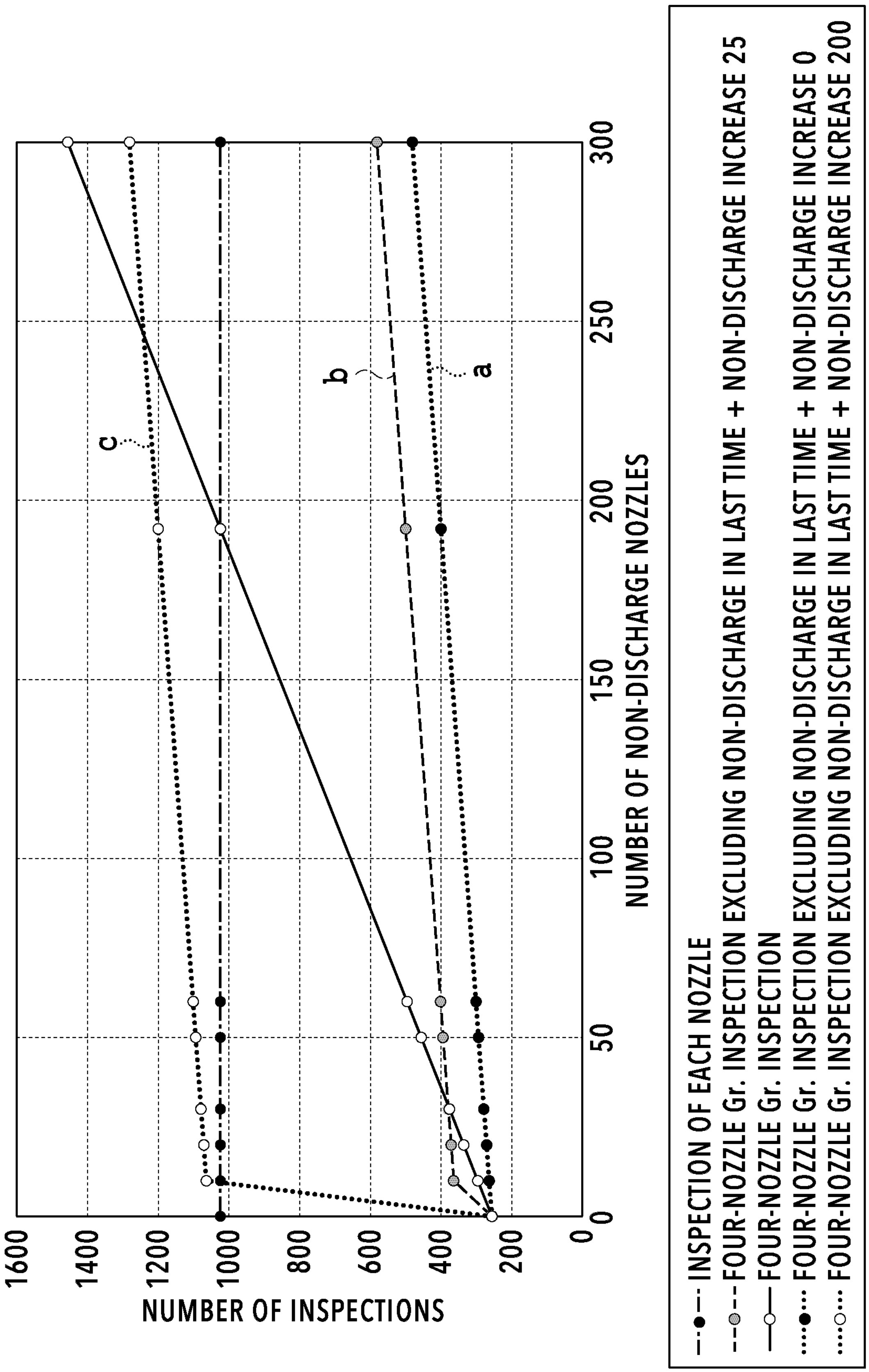
FIG. 10 is a graph in which the number of the non-discharge nozzles is set to a horizontal axis while the number of the inspections is set to a vertical axis.

FIG. 10 is a diagram describing an effect in the present embodiment. FIG. 10 is a graph in which the number of the non-discharge nozzles is set to the horizontal axis, and the number of the inspections is set to the vertical axis. FIG. 10 illustrates a comparison of the number of the inspections between a method of inspecting each nozzle, the example described in the first embodiment, and the present embodiment. In a case of inspecting each nozzle, if one nozzle row includes 1024 nozzles, 1024 times of the inspections are necessary regardless of the number of the non-discharge nozzles. Additionally, as described in the first embodiment, on a straight line of the four-nozzle Gr. inspection in which the number of the nozzles belonging to the inspection nozzle group is four, the number of the inspections is 256 if the number of the non-discharge nozzles on the X-axis is 0 (origin). Then, if the number of the non-discharge nozzles is increased, the number of re-inspections is increased. Thus, it is illustrated that, if the number of the non-discharge nozzles is 192 or more, the number of the inspections is reversed between a case of inspection of each nozzle and the four-nozzle Gr. inspection. This is as described with reference to FIG. 7.

In addition to the above, in the present embodiment, the non-discharge nozzle in the last inspection is set for the sole inspection and is not included in the group formed of four nozzles. As illustrated in FIG. 10, if the number of the non-discharge nozzles on the X-axis is 0 (origin), the number of the inspections is started from 256, and if no new non-discharge nozzle other than the non-discharge nozzle in the last time occurs, a dotted line of a graph a is obtained. In other words, the number of the non-discharge nozzles on the X-axis in the dotted line of the graph a is the same as the number of the non-discharge nozzles in the last time. Additionally, if the number of the non-discharge nozzles is increased by 25 in the inspection this time except the non-discharge nozzle in the last time, a dotted line of a graph b is obtained. In a case of the graph b, it can be seen that, even at the time point of the 192 non-discharge nozzles at which the number of the inspections is reversed between the inspection of each nozzle and the processing in the first embodiment, the number of the inspections is equal to or less than a half of that in a case of the inspection of each nozzle if the processing in the present embodiment is performed. Additionally, in a case where the number of the non-discharge nozzles is increased by 200 in the inspection this time except the non-discharge nozzle in the last time as indicated by a dotted line of a graph c, it is possible to obtain a reduction effect of the number of the inspections if the number of the non-discharge nozzles in the last time is great.

As described above, in the present embodiment, a nozzle determined to be a non-discharge nozzle in the last inspection is not processed on the per-group basis but is inspected solely to determine the discharge state. Therefore, it is possible to reduce the time for inspecting the discharge states.

Fourth Embodiment

In the first embodiment, an example where the nozzles to be inspected are allocated to the inspection nozzle group is described. Additionally, an example where the inspection is performed solely on the nozzle belonging to the inspection nozzle group if it is estimated that there is an abnormality from the inspection of the inspection nozzle group is described. As described above, with the carriage motor 208 being driven and the carriage conveyance belt 207 being moved, the printing head 201 is moved to the position of the liquid droplet detection sensor 205. Depending on the state of the driving control related to the discharge position of the nozzle in the printing head 201 and the movement of the printing apparatus, the normally discharged ink droplet may be discharged to a position not corresponding to the detection position of the liquid droplet detection sensor 205. Therefore, as a result that the ink droplet is not discharged toward the light beam 404 in the liquid droplet detection sensor 205 although the discharge itself of the ink droplet by each nozzle belonging to the inspection nozzle group is normal, it may be determined as abnormal in some cases.

To deal with this, in the present embodiment, an example where, if there is a discharge abnormality in the inspection nozzle group, the inspection is performed on the inspection nozzle group again before the individual inspection to detect the discharge state on a per-inspection nozzle group basis is described. The basic configuration is similar to the example described in the first embodiment.

Figure 11A:
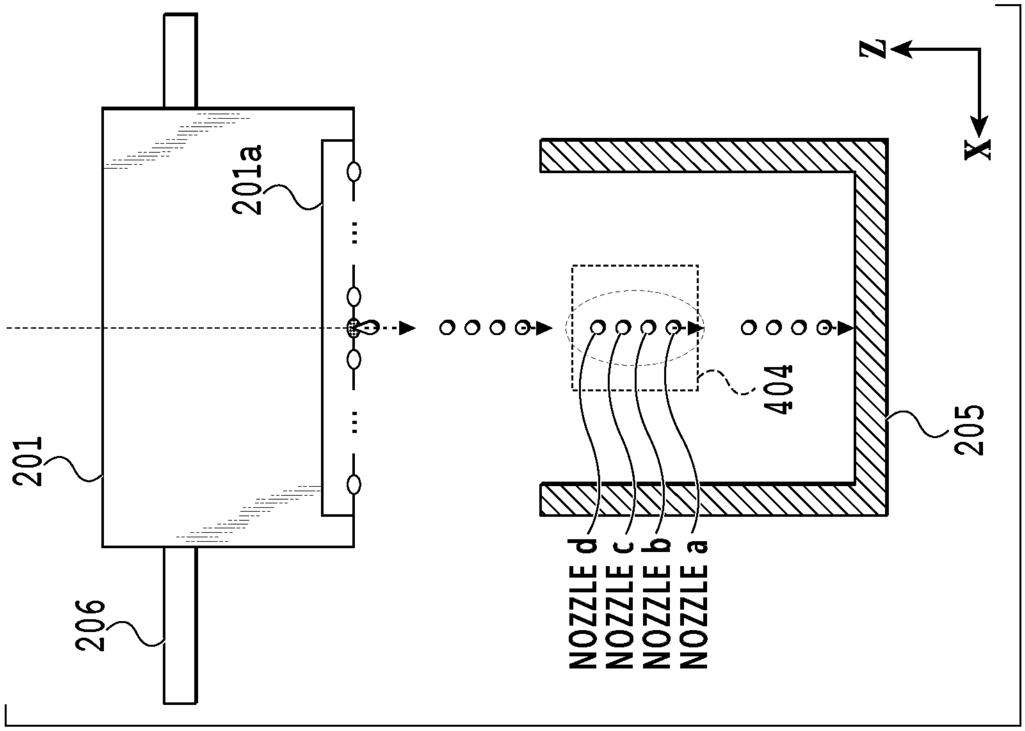
FIGS. 11A and 11B are diagrams describing a method of detecting the discharge state performed on a per-nozzle group basis.

As with FIGS. 5A and 5B, FIGS. 11A and 11B are diagrams describing a method of detecting the discharge state performed on the per-nozzle group basis in the present embodiment. FIG. 11A illustrates a schematic view of the printing head 201 and the liquid droplet detection sensor 205 taken along an X-Z cross-section of the printing apparatus 100. FIG. 5A illustrates the Y-Z cross-section, whereas FIG. 11A illustrates the X-Z cross-section.

Figure 11B:
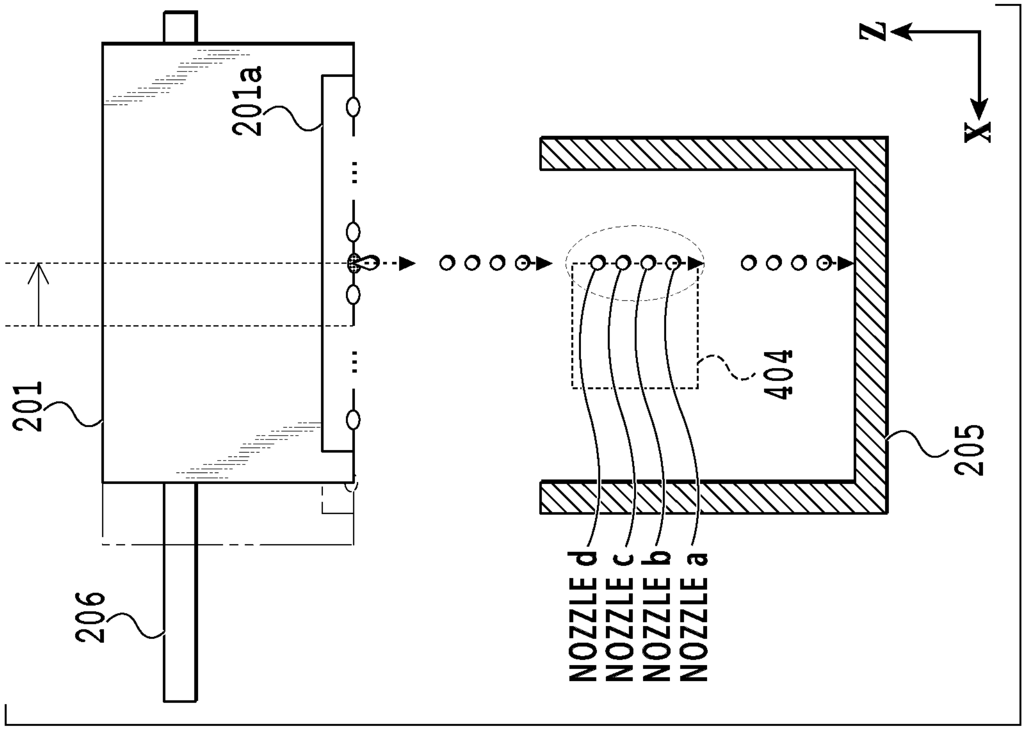

In FIGS. 11A and 11B, the multiple nozzles belonging to the inspection nozzle group are nozzles in the same discharge port row. In FIGS. 11A and 11B, a paper surface depth direction is a direction in which the discharge ports included in the discharge port row extend. Then, the detection of the discharge state is performed on the group N to be inspected (here, as with FIG. 5A, the group N includes the nozzle a, the nozzle b, the nozzle c, and the nozzle d). In FIG. 11A, the ink droplet discharged from each of the nozzle a, the nozzle b, the nozzle c, and the nozzle d is illustrated.

As illustrated in FIG. 11A, the printing head 201 is moved to a predetermined position in the X direction, that is, the detectable position, such that the ink droplet discharged from the inspection nozzle group to be inspected passes through the light beam 404. FIG. 11A illustrates an example where the printing head 201 is moved to a proper position in which the ink droplet discharged from the inspection nozzle group can pass through the light beam 404. As a result, if the discharge is performed correctly, the predetermined change amount in the detection signal is obtained by the liquid droplet detection sensor 205, and it is determined to be a normal discharge state. That is, it is determined that each nozzle belonging to the inspection nozzle group N discharges normally.

On the other hand, FIG. 11B illustrates a schematic view of a case where a position of the moved printing head 201 and the detection position of the liquid droplet detection sensor 205 are misaligned. FIG. 11B illustrates a schematic view of the printing head 201 and the liquid droplet detection sensor 205 taken along the X-Z cross-section of the printing apparatus 100. Particularly in a case of moving a large printing head 201, a load along with the movement tends to be great. For this reason, in a case of moving the printing head 201 such that the position of the inspection nozzle group is aligned with the position corresponding to the light beam 404 in the liquid droplet detection sensor 205, fine adjustment of the printing head position is performed to prevent excessive movement of the printing head 201. Meanwhile, the size of the light beam 404 is also optimized to avoid complication and a cost increase of the liquid droplet detection sensor 205. Therefore, even if the printing head 201 is controlled to be moved to the optimized detection position, the printing head 201 may be moved to a position slightly misaligned from the light beam 404 in some cases.

FIG. 11B illustrates a case where the detection position is misaligned although the driving control on the carriage motor 208 is performed such that the printing head 201 is moved to a predetermined position in the X direction, that is, the detectable position. As a result, even in a case where the inspection nozzle group discharges correctly, the ink droplet cannot properly pass through the light beam 404, and the predetermined change amount in the detection signal cannot be obtained by the liquid droplet detection sensor 205. Therefore, although it is normal discharge, it is determined to be an abnormal discharge state. That is, in the nozzles belonging to the inspection nozzle group N, it is determined that all the nozzles or any one of the nozzles have an abnormal discharge state. As described above, the position of the printing head 201 can be slightly changed in accordance with the fine adjustment. Therefore, in a case where the movement control on the printing head 201 is performed again, the ink droplet discharged from the inspection nozzle group may properly pass through the light beam 404. In the present embodiment, control taking into consideration such a situation is performed.

Figures 12, 12A:
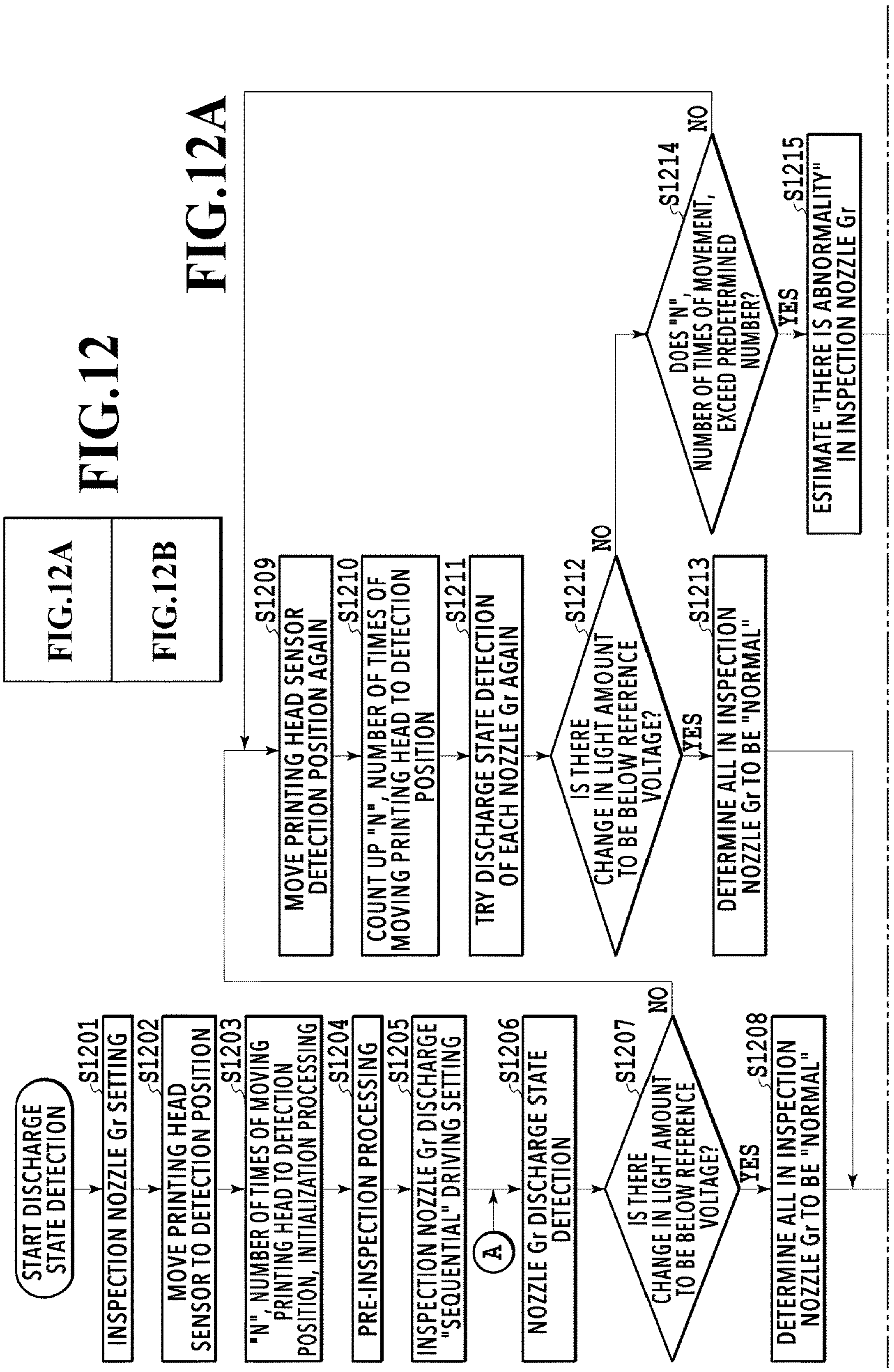
FIG. 12 is a diagram showing the relationship of FIGS. 12A and 12B.
FIGS. 12A and 12B are totally a diagram illustrating an example of a flowchart of control to detect the discharge state.
Figure 12B:
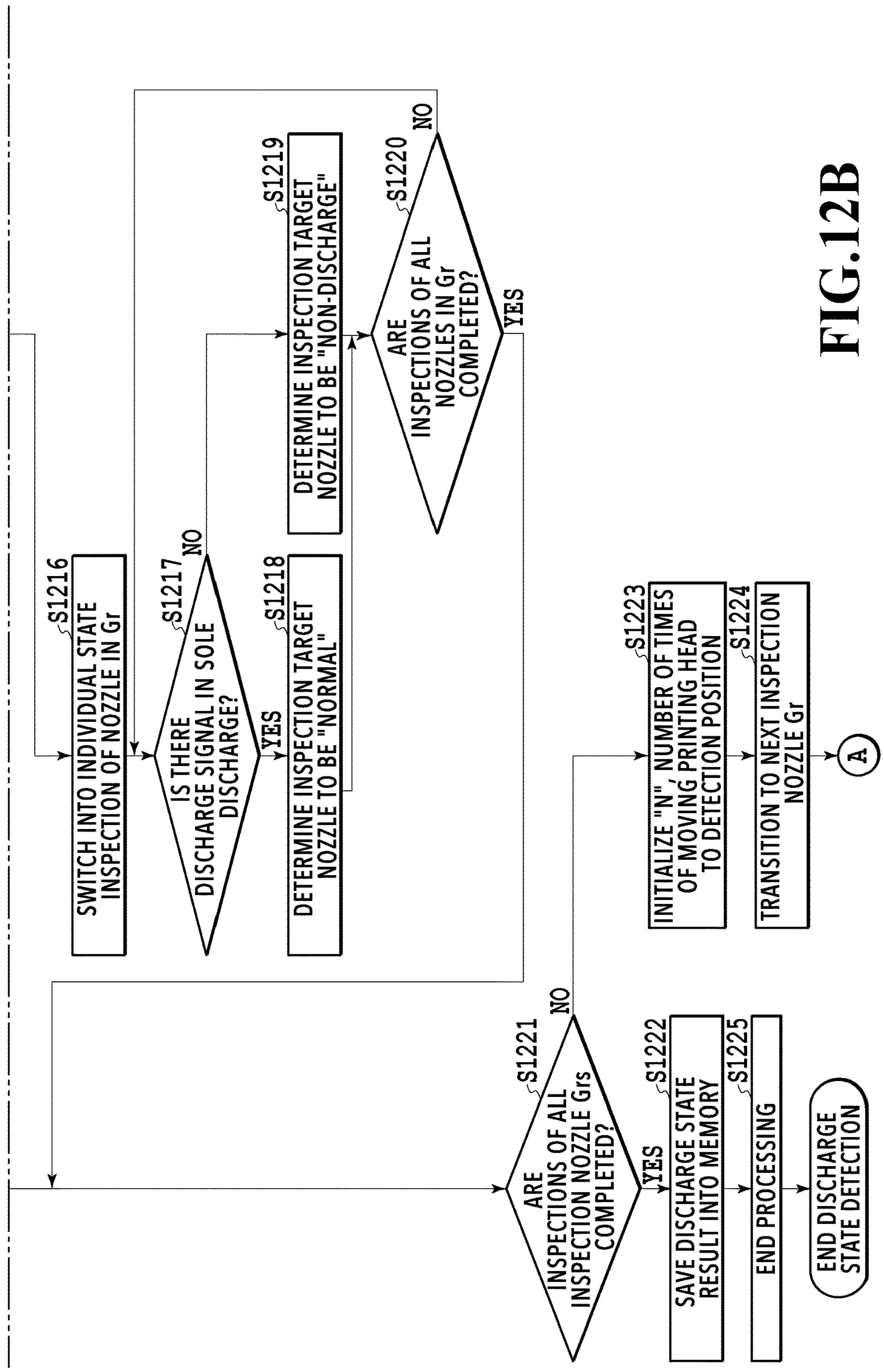

FIGS. 12A and 12B are totally a diagram illustrating an example of a flowchart of control to detect the discharge state in the present embodiment. Processing in FIGS. 12A and 12B partially includes the processing described in FIG. 6. In S1201, the sequence control unit 307 sets the inspection nozzle group. Next, in S1202, the sequence control unit 307 drives the carriage motor 208, performs the driving control on the printing head 201 and the carriage 202, and moves the printing head 201 to the detectable position of the liquid droplet detection sensor 205. Next, in S1203, the sequence control unit 307 performs initialization processing of "n" indicating the number of times of the movement of the printing head 201 to the detection position. Here, the initialization is performed by using a value indicating that the inspection of the discharge state is the first inspection. Note that, processing described later includes processing such as increment processing of the number of times of the movement to the detection position and determination on whether n exceeds a predetermined number. Since the following processing from S1204 to S1208 is similar to each processing described from S603 to S607 in the first embodiment, description herein is omitted. Thus, the processing on the per-inspection nozzle group basis is completed. After S1208, the processing proceeds to S1221. Processing in and after S1221 is described later.

Processing in a case where it is determined in S1207 that the waveform of the detection signal 501 does not fall below the predetermined reference voltage value is described. In S1207, if there is no change in the light amount to the extent to fall below the reference voltage value, the processing proceeds to S1209, and the sequence control unit 307 moves the printing head 201 to the detection position of the liquid droplet detection sensor 205 again as with S1202. In this process, the sequence control unit 307 moves the printing head 201 to the detection position of the liquid droplet detection sensor 205 again after moving the printing head 201 to the reference position. Next, in S1210, the sequence control unit 307 performs increment processing of "n" indicating the number of times of the movement of the printing head 201 to the detection position. Next, in S1211, as with S1206, the sequence control unit 307 retries the inspection of the discharge state of the inspection nozzle group to be inspected. Next, in S1212, as with S1207, the sequence control unit 307 determines again whether the waveform of the detection signal 501 falls below the predetermined reference voltage value as a result of the retrial of the inspection. If the waveform of the detection signal 501 falls below the reference voltage value, the processing proceeds to S1213. In S1213, the sequence control unit 307 determines that all the nozzles in the inspection nozzle group are normal. That is, although it is determined once that the nozzle in the inspection nozzle group cannot discharge normally in the processing in S1207, it is determined to be normal discharge by the repeated retrial of the inspection. As described with reference to FIGS. 11A and 11B, an effect of the positional misalignment and the like that occur during the driving control on the printing head 201 to the detectable position of the liquid droplet detection sensor 205 may be corrected by the retrial of the inspection. Therefore, it is possible to expect that the detection of the discharge state is performed with the ink droplet discharged from the optimal detection position passing through the light beam 404. After S1213, the processing proceeds to S1221. On the other hand, if the detection signal does not fall below the reference voltage in S1212, the sequence control unit 307 allows the processing to proceed to S1214. In S1214, the sequence control unit 307 determines whether the number of times of "n" indicating the number of times of the movement of the printing head 201 to the detection position exceeds a predetermined number designated in advance. If "n", the number of times of the movement to the detection position, exceeds the predetermined number, the processing proceeds to S1215, and the sequence control unit 307 determines that the nozzle in the inspection nozzle group has an abnormality. That is, it is estimated that the movement itself of the printing head 201 to the optimal detection position in which the discharged ink droplet passes through the light beam 404 in the liquid droplet detection sensor 205 is achieved by the repeated trial of the driving control on the printing head 201. However, it is assumed that the ink droplet cannot block the light beam 404 because the nozzle in the inspection nozzle group has an abnormality, and the desirable decrease in the light amount is not obtained. Therefore, the processing proceeds to processing after S1215. On the other hand, if "n", the number of times of the movement to the detection position, does not exceed the predetermined number, the processing returns to S1209 and repeats the processing. Subsequent to S1215, in S1216, the sequence control unit 307 switches the processing to a method of individually inspecting each nozzle in the inspection nozzle group as a current processing target.

Subsequent to S1216, in S1217, the sequence control unit 307 determines whether the detection signal of the sole discharge of the inspection target nozzle can be detected. That is, it is determined whether the waveform of the detection signal 501 falls below the reference voltage. If the waveform of the detection signal 501 falls below the reference voltage, the processing proceeds to S1218, the sequence control unit 307 determines the inspection target nozzle to be a normal nozzle. On the other hand, if the waveform of the detection signal 501 does not fall below the reference voltage, the processing proceeds to S1219, and the sequence control unit 307 determines the inspection target nozzle to be a non-discharge nozzle and stores a nozzle number thereof into the memory 303. Subsequent to S1218 or S1219, in S1220, the sequence control unit 307 determines whether the processing of all the nozzles in the inspection nozzle group ends, and if there is a nozzle not processed yet, the processing returns to S1217 and repeats the processing. If the processing of all the nozzles in the inspection nozzle group ends, the processing proceeds to S1221.

In S1221, the sequence control unit 307 determines whether all the inspections of the inspection nozzle groups end. If the inspections of all the inspection nozzle groups does not end, the processing proceeds to S1223, and "n", the number of times of the movement of the printing head 201 to the detection position, is initialized. Next, in S1224, the sequence control unit 307 sets the inspection nozzle group as a next inspection target, and the processing proceeds to S1206. If the inspections of all the inspection nozzle groups end, the processing proceeds to S1222, and the sequence control unit 307 saves the results of the discharge states of all the nozzles included in the printing head 201 into the memory 303. Next, the processing proceeds to S1225, the sequence control unit 307 performs end processing, and the processing of the flowchart in FIGS. 12A and 12B ends.

As described above, in the present embodiment, in a case where normal discharge cannot be detected by the inspection of the inspection nozzle group, the inspection nozzle group is not determined as including a non-discharge nozzle based on the result of the one inspection. Assuming that even though the inspection nozzle group performs the discharge normally, the discharge to the light beam 404 in the liquid droplet detection sensor 205 is not performed optimally because of various causes, the retrial is repeated to employ the determination result therefrom. Therefore, it is possible to suppress the extension of the time for the inspection of the discharge state without unnecessarily switching into the processing of detecting the discharge state of each individual nozzle.

Note that, although the present embodiment is described based on the first embodiment, the configuration of retrying the inspection described in the present embodiment may be applicable to a case of inspecting the inspection nozzle group in the second embodiment or the third embodiment.

Other Embodiments

In the above-described embodiment, an example where the nozzles belonging to the nozzle group to be inspected are determined from a single discharge port row is described; however, it is not limited thereto. As long as the configuration allows for the detection of all the ink droplets discharged from the nozzles belonging to different discharge port rows in a detection area without increasing the size of the device, the nozzles belonging to the different discharge ports may belong to the same nozzle group to be inspected.

Additionally, in the above-described embodiment, an example where the nozzle information indicating the discharge state of the nozzle is saved in the memory 303 is described; however, a destination to which the nozzle information is saved is not limited to the memory 303. Moreover, the nozzle information may be saved in an external server of the printing apparatus 100 and the like.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-089483, filed Jun. 1, 2022, and No. 2022-211858, filed Dec. 28, 2022, which are hereby incorporated by reference herein in their entirety.

What is claimed is:

1. A printing apparatus comprising:

a printing head including a plurality of nozzles each configured to discharge a liquid droplet;

a detection unit configured to detect the discharge of the liquid droplet by using a light beam emitted in a position facing the printing head; and a control unit configured to inspect whether discharge states of the nozzles are normal or abnormal based on a result of the detection by the detection unit, wherein the control unit drives the nozzles per nozzle group, each nozzle group including at least two or more nozzles, and determines a per-nozzle-group discharge state, wherein the control unit retries an inspection per nozzle group by the detection unit on a nozzle group determined as having an abnormal discharge state, and determines again whether the discharge state is abnormal, wherein the control unit counts a number of retrials performed for the same nozzle group and compares the counted number with a predetermined value stored in a memory, wherein in a case where the counted number does not exceed the predetermined value, the control unit continues per-nozzle-group inspection, and wherein in a case where the counted number exceeds the predetermined value, the control unit individually inspects a discharge state of each nozzle belonging to the nozzle group determined as having an abnormal discharge state.

2. The printing apparatus according to claim 1, wherein in a case where the per-nozzle-group discharge state is determined to be normal, the control unit determines that the discharge state of each nozzle belonging to the nozzle group is normal.

3. The printing apparatus according to claim 1, wherein the control unit discharges the liquid droplet from each of the nozzles belonging to the nozzle group such that all the liquid droplets discharged from the nozzles belonging to the nozzle group concurrently block the light beam.

4. The printing apparatus according to claim 1, wherein the printing head includes a plurality of nozzle rows, and wherein nozzles belonging to the same nozzle group are nozzles in the same nozzle row.

5. The printing apparatus according to claim 1, wherein the control unit obtains nozzle information indicating a discharge state of a nozzle obtained as a result of a previous inspection from a storage unit storing the nozzle information, and determines the nozzles belonging to each nozzle group based on the nozzle information.

6. The printing apparatus according to claim 5, wherein the control unit determines the number of the nozzles to belong to each nozzle group depending on the number of abnormal nozzles in the previous inspection.

7. The printing apparatus according to claim 5, wherein the control unit determines the number of the nozzles to belong to each nozzle group depending on the number of abnormal nozzles in the last inspection.

8. The printing apparatus according to claim 5, wherein the control unit determines the nozzles excluding the abnormal nozzles in the previous inspection as nozzles to belong to nozzle groups.

9. The printing apparatus according to claim 8, wherein the control unit performs per-nozzle inspection on the abnormal nozzles in the previous inspection.

10. The printing apparatus according to claim 5, wherein the control unit determines the nozzles excluding the abnormal nozzles in the last inspection as nozzles to belong to nozzle groups.

11. The printing apparatus according to claim 10, wherein the control unit performs per-nozzle inspection on the abnormal nozzles in the last inspection.

12. The printing apparatus according to claim 1, wherein the control unit sequentially performs per-nozzle-group inspections, and even if there is a nozzle group determined as having an abnormal discharge state, first completes the per-nozzle-group processing and thereafter performs an inspection of each nozzle belonging to the nozzle group determined as having the abnormal discharge state.

13. The printing apparatus according to claim 1, wherein the detection unit includes (1) a light-emission element configured to emit the light beam and (2) a light-reception element configured to receive the light beam, and outputs a detection signal based on the light reception by the light-reception element, and wherein the control unit inspects the discharge state of the nozzles based on a change in the detection signal.

14. The printing apparatus according to claim 1, wherein each retrial comprises moving the printing head to a detection position, and wherein the control unit counts the number of retrials performed for the same nozzle group by counting a number of times that the nozzle group moves to the detection position.

15. A method of controlling a printing apparatus, the printing apparatus including (1) a printing head including a plurality of nozzles each configured to discharge a liquid droplet and (2) a detection unit configured to detect the discharge of the liquid droplet by using a light beam emitted in a position facing the printing head, wherein whether discharge states of the nozzles are normal or abnormal is inspected based on a result of the detection by the detection unit, the method comprising:

driving the nozzles per nozzle group, each nozzle group including at least two or more nozzles, and determining a per-nozzle-group discharge state;

retrying an inspection per nozzle group by the detection unit on a nozzle group determined as having an abnormal discharge state, and determining again whether the discharge state is abnormal;

counting a number of retrials performed for the same nozzle group;

comparing the counted number with a predetermined value stored in a memory;

in a case where the counted number does not exceed the predetermined value, continuing per-nozzle-group inspection; and in a case where the counted number exceeds the predetermined value, performing individual inspection of a discharge state of each nozzle belonging to the nozzle group determined as having an abnormal discharge state.

16. A non-transitory computer-readable storage medium storing a program, the program causing a computer to execute a method of controlling a printing apparatus, the printing apparatus including (1) a printing head including a plurality of nozzles each configured to discharge a liquid droplet and (2) a detection unit configured to detect the discharge of the liquid droplet by using a light beam emitted in a position facing the printing head, wherein whether discharge states of the nozzles are normal or abnormal is inspected based on a result of the detection by the detection unit, the method comprising:

driving the nozzles per nozzle group, each nozzle group including at least two or more nozzles, and determining a per-nozzle-group discharge state;

retrying an inspection per nozzle group by the detection unit on a nozzle group determined as having an abnormal discharge state, and determining again whether the discharge state is abnormal;

counting a number of retrials performed for the same nozzle group;

comparing the counted number with a predetermined value stored in a memory;

in a case where the counted number does not exceed the predetermined value, continuing per-nozzle-group inspection; and in a case where the counted number exceeds the predetermined value, performing individual inspection of a discharge state of each nozzle belonging to the nozzle group determined as having an abnormal discharge state.

* * * * *